(12) United States Patent
Owens

(10) Patent No.: US 8,097,336 B2
(45) Date of Patent: *Jan. 17, 2012

(54) METHODS AND SYSTEMS FOR MANUFACTURING A STRUCTURE HAVING ORGANIZED AREAS

(76) Inventor: Charles R. Owens, Alexandria, VA (US)

( * ) Notice: Subject to any disclaimer, the term of this patent is extended or adjusted under 35 U.S.C. 154(b) by 57 days.

This patent is subject to a terminal disclaimer.

(21) Appl. No.: 11/953,492

(22) Filed: Dec. 10, 2007

(65) Prior Publication Data

US 2008/0176092 A1 Jul. 24, 2008

Related U.S. Application Data

(60) Continuation of application No. 11/014,228, filed on Dec. 17, 2004, now abandoned, which is a continuation-in-part of application No. 10/899,882, filed on Jul. 26, 2004, now Pat. No. 7,927,528, which is a division of application No. 09/860,349, filed on May 17, 2001, now Pat. No. 6,767,619.

(60) Provisional application No. 60/531,454, filed on Dec. 18, 2003.

(51) Int. Cl.
*B32B 3/26* (2006.01)
*B29B 7/00* (2006.01)
*B29C 33/76* (2006.01)

(52) U.S. Cl. ............... 428/304.4; 428/313.3; 428/318.4; 428/542.8; 428/703; 264/317; 52/576; 52/577

(58) Field of Classification Search ............... 428/304.4, 428/313.3, 318.4, 542.8, 703; 264/317; 52/576, 52/577

See application file for complete search history.

(56) References Cited

U.S. PATENT DOCUMENTS

| 948,541 | A | 2/1910 | Coleman |
|---|---|---|---|
| 2,881,717 | A | 4/1959 | Fuller |
| 2,905,113 | A | 9/1959 | Fuller |
| 2,914,074 | A | 11/1959 | Fuller |
| 2,920,354 | A | 1/1960 | Zumbrunnen |
| 2,986,241 | A | 5/1961 | Fuller |
| 3,063,521 | A | 11/1962 | Fuller |
| 3,135,044 | A | 6/1964 | Schafer |
| 3,139,959 | A | 7/1964 | Kraft |
| 3,229,437 | A | 1/1966 | Adie |
| 3,354,591 | A | 11/1967 | Fuller |
| 3,412,519 | A | 11/1968 | Brettingen |
| 3,495,367 | A | 2/1970 | Kobayashi |
| 3,608,034 | A | 9/1971 | Bramley et al. |
| 3,703,012 | A | 11/1972 | Mast et al. |
| 3,810,336 | A | 5/1974 | Sadao |
| 3,897,164 | A | 7/1975 | Dodino |
| 3,970,301 | A | 7/1976 | Lehmann |
| 4,059,932 | A | 11/1977 | Resch |
| 4,156,997 | A | 6/1979 | Decker et al. |

(Continued)

FOREIGN PATENT DOCUMENTS

DE 3217593 11/1983

(Continued)

*Primary Examiner* — Victor Chang

(57) ABSTRACT

A beaded preform includes a plurality of adjacently positioned beads for forming a plurality of voids in an engineered material. The beaded preforms may be comprised of a filaments (single strand of beads) and mats (two-dimensional and three dimensional arrays of beads). The filaments and mats may be coated to become tows and laminates, respectively, which may then be assembled into composite materials. The preforms may be produced using novel manufacturing apparatuses and methods, and incorporated into known manufacturing processes to produce porous structures, including stress-steering structures, in any material including metals, plastics, ceramics, textiles, papers, and biological materials, for example. Permanent bead material is preferably made of polyacrylonitrile, carbon fiber, or graphite.

19 Claims, 38 Drawing Sheets

U.S. PATENT DOCUMENTS

| | | | |
|---|---|---|---|
| 4,207,715 A | 6/1980 | Kitrick |
| 4,238,905 A | 12/1980 | MacGraw, III |
| 4,679,361 A | 7/1987 | Yacoe |
| 4,711,062 A | 12/1987 | Gwilliam |
| 4,723,382 A | 2/1988 | Lalvani |
| 4,793,394 A | 12/1988 | Cohen |
| 4,804,565 A | 2/1989 | Rast |
| 5,035,967 A | 7/1991 | Hasegawa |
| 5,070,673 A | 12/1991 | Weisse |
| 5,110,661 A | 5/1992 | Groves |
| 5,157,893 A | 10/1992 | Benson |
| 5,175,975 A | 1/1993 | Benson |
| 5,230,196 A | 7/1993 | Zeigler |
| 5,261,194 A | 11/1993 | Roberts |
| 5,329,737 A | 7/1994 | Roberts |
| 5,331,779 A | 7/1994 | Hing |
| 5,448,868 A | 9/1995 | Lalvani |
| 5,615,528 A | 4/1997 | Owens |
| 5,660,003 A | 8/1997 | Owens |
| 5,816,009 A | 10/1998 | Owens |
| 5,958,314 A | 9/1999 | Draenert |
| 6,558,602 B1 | 5/2003 | Melbye |
| 6,673,285 B2 | 1/2004 | Ma |
| 6,767,619 B2 | 7/2004 | Owens |
| 2002/0172817 A1 | 11/2002 | Owens |

FOREIGN PATENT DOCUMENTS

| | | |
|---|---|---|
| DE | 19859633 | 12/1998 |
| JP | 61031369 | 2/1986 |
| WO | 91/19867 | 12/1991 |

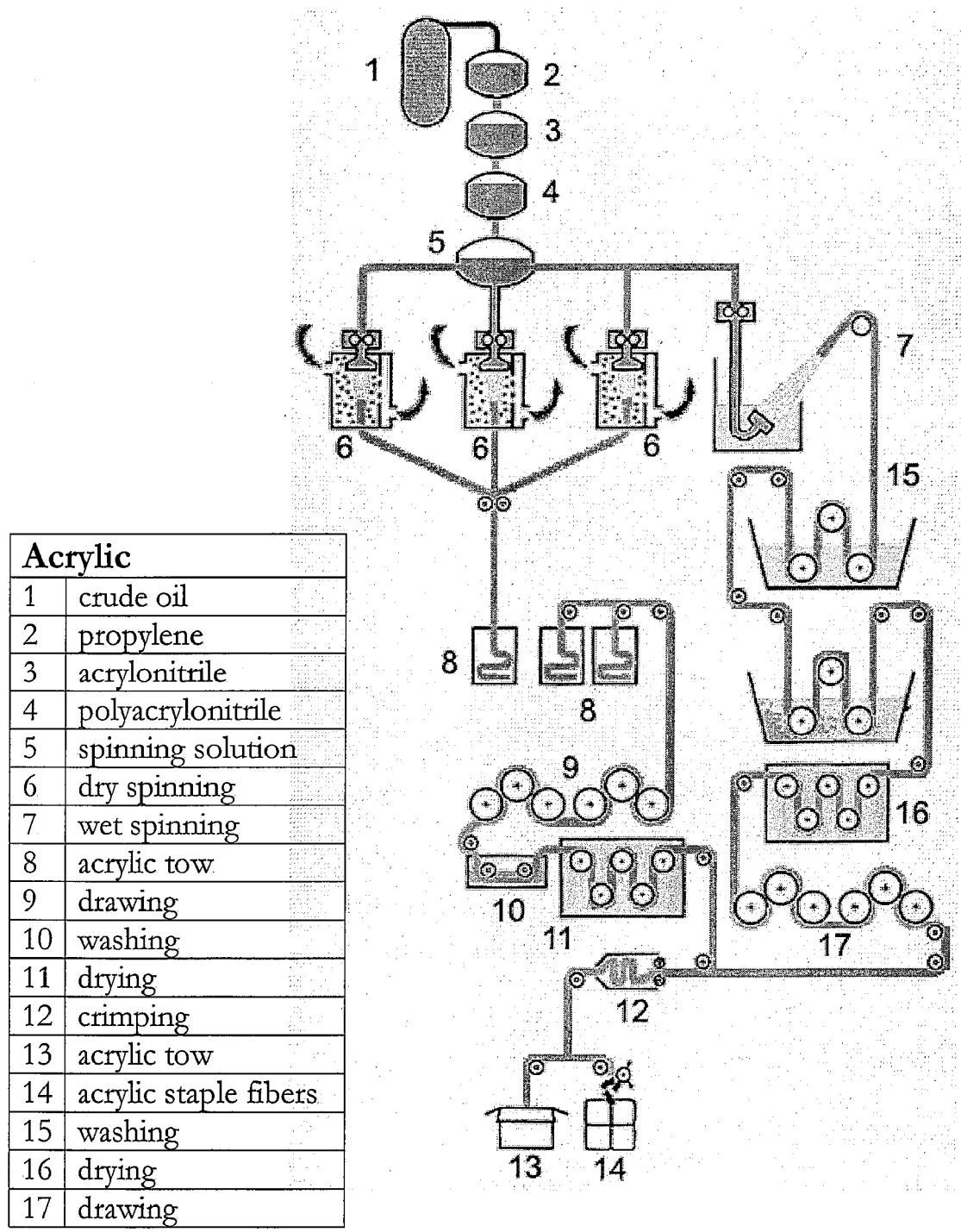
Figure 30. Process Diagram for acrylic manufacture.

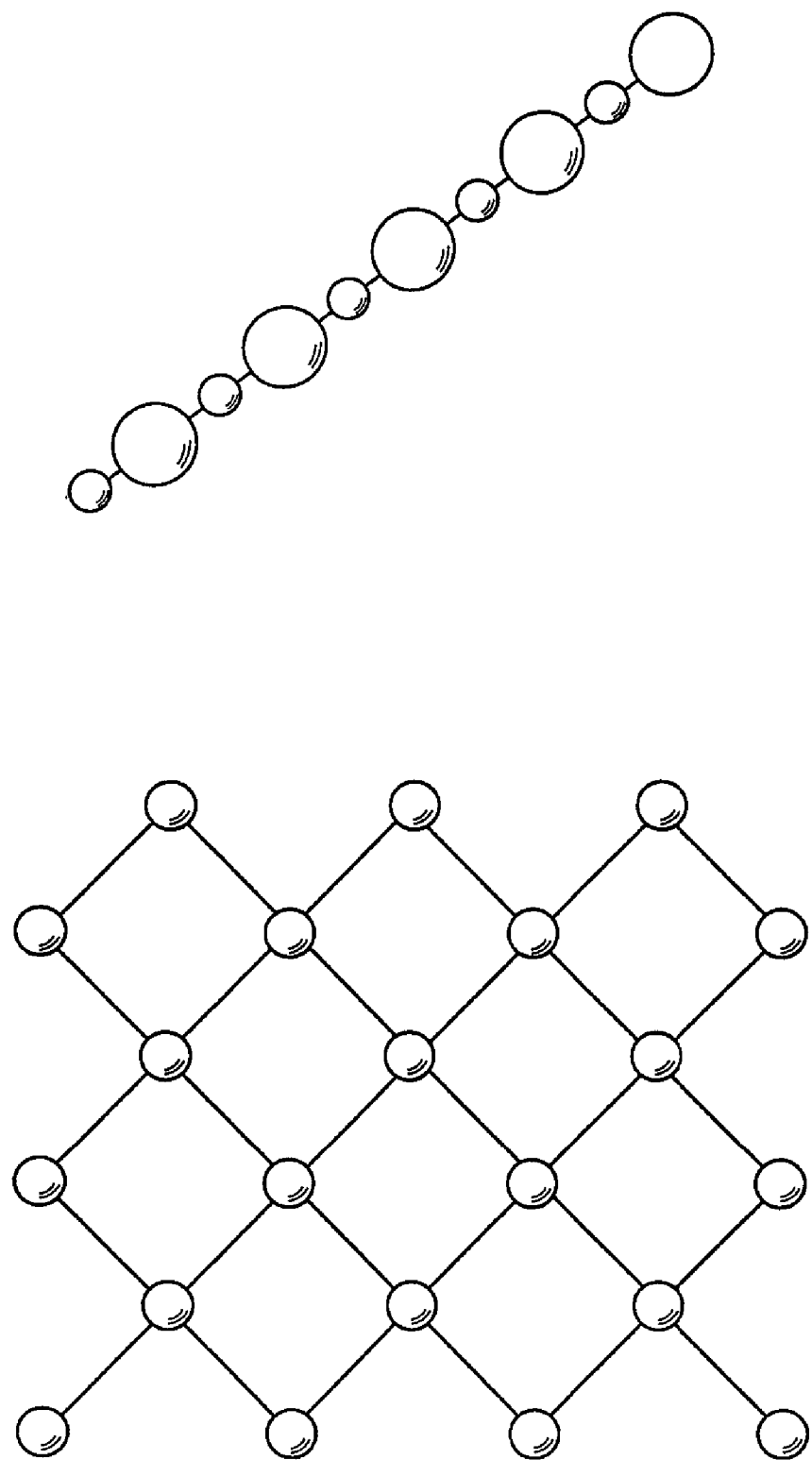
Figure 31. Beaded Filament and Beaded Mat.

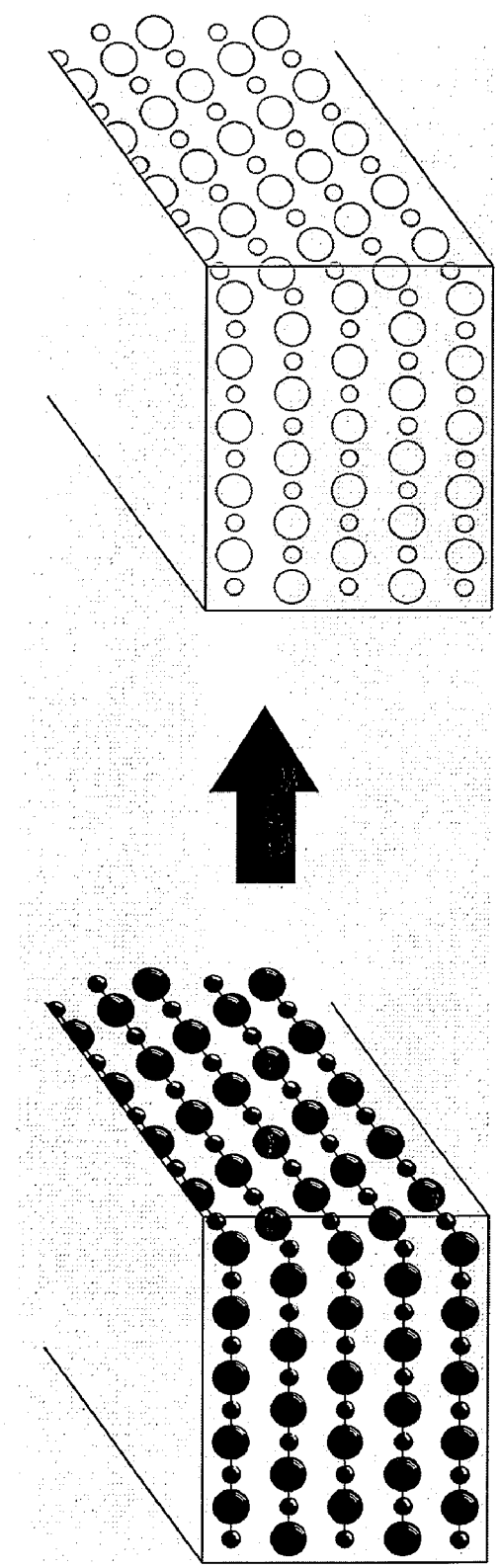
Figure 32. Aggregates of beaded filaments serve as preforms to the voids formed within an entire product

| Grades of Carbon Fiber ||||| 
|---|---|---|---|---|
| Carbonization Temperature (°C) | to 1000 | 1000 - 1500 | 1500 - 2000 | 2000 + (Graphitization) |
| Grade of Carbon Fiber | Low Modulus | Standard Modulus | Intermediate Modulus | High Modulus |
| Modulus of Elasticity (GPa) | to 200 | 200 - 250 | 250 - 325 | 325+ |

Source: Vince Kelly's Carbon Fiber Homepage http://www.geocities.com/CapeCanaveral/1320/

Figure 33. The temperature will determine the *grade* of fiber produced.

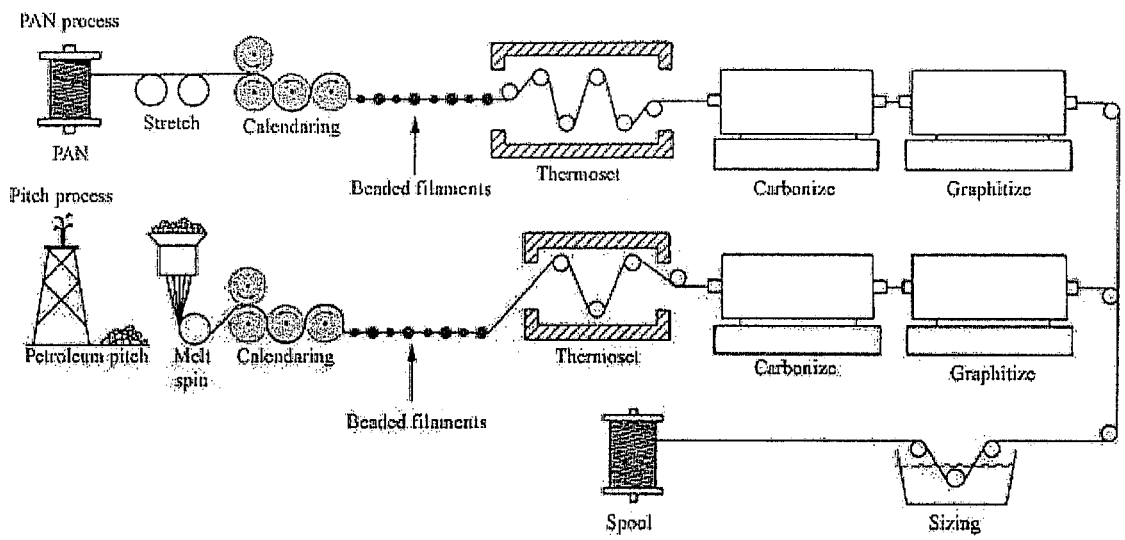
Figure 34. The Processing sequence for polyacrylonitrile (PAN) and mesophase-pitch-based RMT Beaded Filaments.

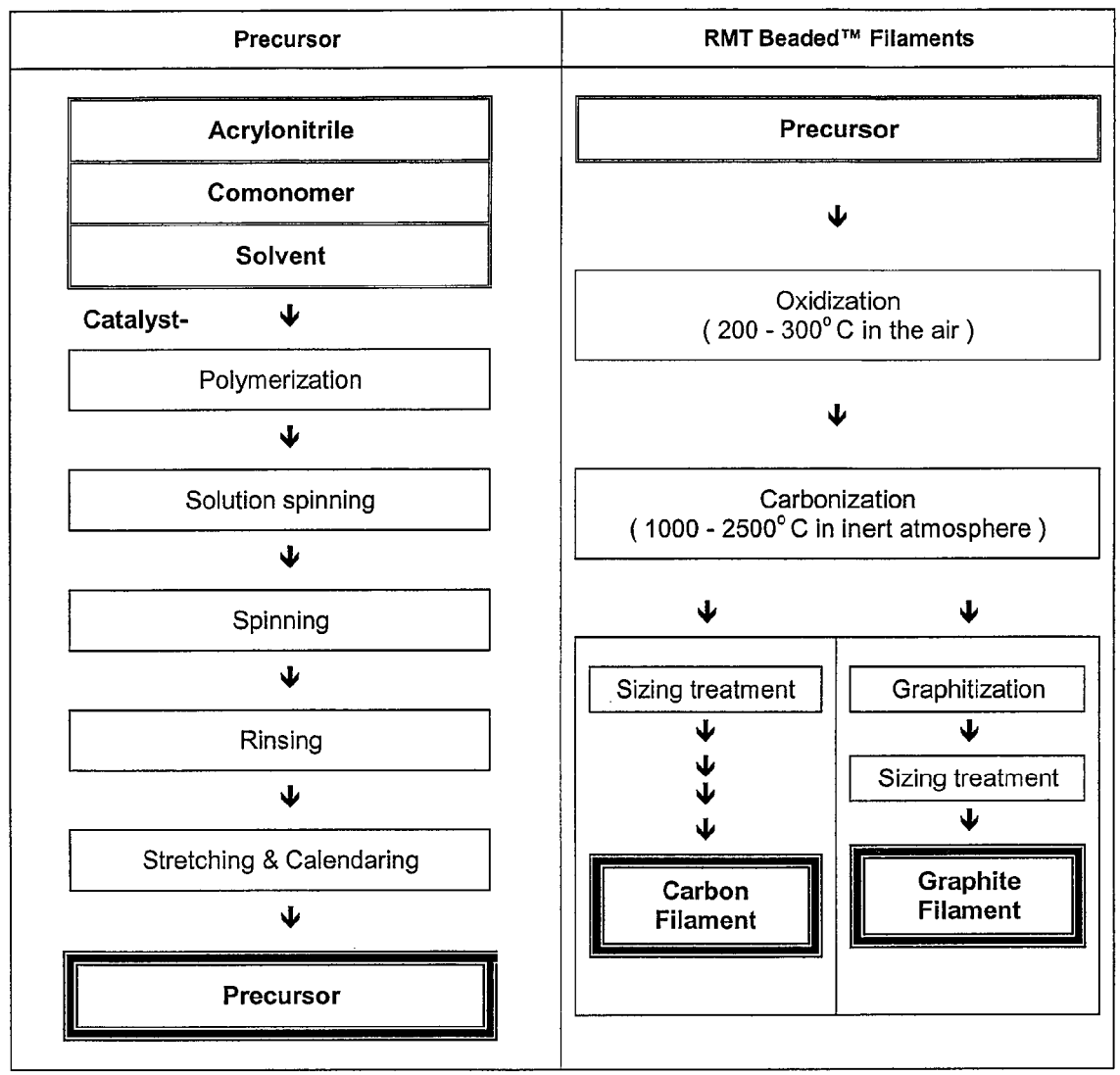
Figure 35. Permanent RMT Beaded Filaments are made by heat treatment of special acrylic fiber (precursor) as a raw material.

METHODS AND SYSTEMS FOR MANUFACTURING A STRUCTURE HAVING ORGANIZED AREAS

CROSS-REFERENCE TO RELATED APPLICATIONS

This application is a continuation application of U.S. patent application Ser. No. 11/014,228, filed Dec. 17, 2004, now abandoned, which is a continuation-in-part of U.S. application Ser. No. 10/899,882, filed Jul. 26, 2004, now U.S. Pat. No. 7,927,528, which is a divisional of U.S. application Ser. No. 09/860,349, filed May 17, 2001, now U.S. Pat. No. 6,767,619, the contents of all of which are incorporated herein by reference. This application claims priority to U.S. provisional application 60/531,454, filed Dec. 18, 2003, the contents of which is also incorporated by reference.

FIELD OF THE INVENTION

The present invention relates to the design and manufacture of materials, and more particularly to a preform component used to generate voids, pores, or cavities in any material especially engineered materials.

BACKGROUND

This invention relates in general to, the ability to establish a plurality of organized voids in a material, and also to load bearing structures and structures that provide an enhanced trade-off between the stress that can be safely carried in relation to the amount of material required for the structure.

Generally, voids have been created in materials using a number of existing foaming techniques. These foaming techniques produce materials having voids which are unorganized; i.e., the voids are randomly positioned as well as randomly placed. Moreover, a number of the voids in these materials are not enclosed—they are interconnected with adjacent voids.

Accordingly, existing processes cannot produce materials having enclosed voids and/or voids in a truly organized position within a material. Current techniques will also not allow voids to be created to an exact predetermined size and shape which are substantially self-enclosed.

Having voids which are organized non-interconnected voids is especially important in stress steering materials. Stress steering materials allow for forces placed on a structure to be resolved largely into compressive forces.

Such stress steering materials having symmetrically arranged voids have been developed which resolve a substantial majority of the stresses placed on the material into compressive stress using a novel structure containing voids. Such novel structures are disclosed in U.S. Pat. Nos. 5,615,528, 5,660,003, and 5,816,009, the disclosures of which are incorporated herein by reference (each patent being owned in common with the present application). Each of these disclosures describes the use of a plurality of uniform, symmetrically arrayed voids throughout the base material which results in a material structure that resolves the forces imposed thereon largely into compressive rather than tensile stress.

Research by NASA, and other respected scientific organizations, has determined that the more nearly uniform the voids and the more nearly symmetrical the arrangement of voids in a material, the greater the effective tensile strength of the material. Consequently, makers of foamed materials, and other materials in which porosity is a factor, have long sought a commercial method for positioning pores, or voids, of a predetermined size(s) in predetermined locations in a material to give the material a precise, three-dimensional morphology in order to optimize its effective tensile strength.

However, incorporating these voids in a three-dimensional symmetrical arrangement in materials is at best an arduous and costly task using conventional manufacturing techniques. Indeed, this is not yet possible with known material foaming techniques. Hence, the widespread use and acceptance of porous materials, including the stress steering materials disclosed in the above-identified patents, have been hampered due to the difficulties of incorporating the essential voids in materials.

Accordingly, there exists a need for a material, process, and/or system that will allow for easy manufacture of materials with predetermined morphologies that incorporate voids, including the patented stress steering materials.

SUMMARY OF THE INVENTION

Accordingly, the present invention provides methods and apparatuses for creating organized voracity (voids positioned in a predetermined arrangement) in any material. The voids created using these novel methods and apparatus may be of any size, shape, and spacing, and may also be interconnected or each may be entirely enclosed.

Moreover, the spacing of the voids in a particular material may be symmetrical and/or asymmetrical to attain a desired material characteristic. Thus, to attain stress-steering according to the materials disclosed in the aforementioned patents, the voids must be arranged in a particular symmetrical arrangement.

Accordingly, materials with predetermined morphologies that incorporate voids, including the patented stress-steering materials that utilize a plurality of symmetrically arrayed, uniform voids to resolve forces imposed on a structure primarily into a compressive rather than tensile stress, may be manufactured using the unique and novel components and methods according to the present invention.

The preforms, examples of voided structures, as well as the manufacturing apparatuses and methods according to the present invention are also disclosed in a corresponding provisional application, No. 60/291,904, filed May 17, 2001. entitled, "Preform For Manufacturing A Material Having A Plurality of Voids And Method Of Making The Same", the entire disclosure of which is incorporated herein by reference.

In preferred embodiments of the present invention, voids are incorporated into a material through the use of either a preform material component or texturizing, or a combination of the two. The voids may be created in a material using known manufacturing methods.

Thus, it is an object of this invention to provide a component material for establishing a plurality of voids.

It is another object of the present invention to provide a method of imparting a plurality of voids into a material.

Accordingly, in one aspect of the present invention, a beaded preform for forming a plurality of voids in an engineered material includes a plurality of adjacently positioned beads.

In another aspect of the present invention, a method for manufacturing a beaded preform for forming a plurality of voids in an engineered material includes extruding a preform material out a first opening to produce an extruded preform material and calendaring the extruded preform material to form a plurality of adjacently positioned beads thereon.

In yet another aspect of the present invention, a method for manufacturing a coated, beaded preform for forming a plurality of voids in an engineered material includes providing a first flow of an extruding coating material to die, providing a beaded preform within the first flow, where the beaded preform is coated with the coating material, and extruding the first flow with the beaded preform from an opening to form a tow.

In yet another aspect of the present invention, a method for producing an engineered material having a plurality of voids includes guiding a plurality of beaded preforms into a supply of a first material, coating the plurality of beaded preforms with the first material, shaping the coated preforms into a predetermined form and consolidating the form.

In yet another aspect of the present invention, a method for producing an engineered structure comprised of a plurality of organized voids using a continuous casting apparatus includes guiding a beaded preform comprising a plurality of adjacently positioned beads into a matrix material, the material matrix held in a first container, guiding the matrix material into a space having a predetermined distance, whereby a product is formed having a predetermined thickness substantially equal to the distance.

In yet another aspect of the present invention, a method for forming a composite having a plurality of organized voids arranged therein includes imparting a first array of first voids upon a first laminate, whereby openings to the first voids are formed on a first side of the first laminate, and assembling the first laminate with a second laminate.

In yet another aspect of the present invention, a laminate for assembly into a composite material includes a texture comprising a plurality of recesses on a first side, where the recesses correspond to a plurality of projections on a second side of the laminate.

In yet another aspect of the present invention, a method of manufacturing an engineered material having a plurality of organized voids includes guiding a beaded preform comprising a plurality of spaced apart beads within a continuous cast of molten material.

In yet another aspect of the present, a method of manufacturing an engineered material having a plurality of organized voids includes providing a beaded preform comprising a strand of adjacently positioned beads into any one of the following manufacturing processes:

additive manufacturing, atomistic manufacturing, layered manufacturing including fused deposition modeling, stereolithography, optical fabrication, solid base (ground) curing, plasma spray forming, sputtering, vapor deposition, deformation and forming including bulk deformation processes including impression-die forging, open-die forging, coining, piercing, hubbing, fullering and edging, roll forging, ring rolling, direct extrusion, indirect extrusion, hydrostatic extrusion and impact extrusion, sheet metal forming processes including shearing, bulging, rubber forming, high-energy-rate forming, superplastic forming, deep drawing, embossing, material removal including cutting, grinding, electrical discharge machining, water-jet machining, abrasive-jet machining, chemical machining and electrochemical machining and grinding, casting including permanent molds including slush casting, pressure casting, insert molding, centrifugal casting and infiltration casting. expendable molds including vacuum casting, ceramic-mold casting, plaster-mold casting, shell-mold casting and sand casting, gel-casting, injection molding, compression molding, transfer molding, insert molding, particulate material processing including sintering, cold isostatic pressing, and hot isostatic pressing, and assembly and joining processes including friction stir welding, Resistance welding, explosive welding, brazing and soldering, arc welding, and laser welding.

Another aspect of the invention relates to the above-described embodiments wherein the bead material is polyacrylonitrile, carbon fiber, graphite, or combinations thereof.

These aspects will be better understood with reference to the accompanying drawings and the below detailed written description of the present invention.

BRIEF DESCRIPTION OF THE DRAWINGS

FIG. 30 illustrates a process diagram for acrylic manufacture.

FIG. 31 illustrates a beaded filament and a beaded mat.

FIG. 32 illustrates aggregates of beaded filaments serving as preforms to the voids formed with an entire product.

FIG. 33 illustrates the different grades of carbon fiber.

FIG. 34 illustrates the processing sequence for PAN and mesophase-pitch-based beaded filaments.

FIG. 35 illustrates a manufacturing process of PAN-based beaded filaments.

DETAILED DESCRIPTION OF THE PREFERRED EMBODIMENTS

Beaded Preforms as Precursors to Organized Voided Materials

A beaded preform according to the present invention is a precursor component for incorporation into a material to form predetermined symmetrical or asymmetrical positioned or otherwise organized voids, or pores, to establish, for example, a material having organized voracity. An example of such a material is a stress steering structure for resolving imposed loads primarily into compressive stress. Two-dimensional cross-sections of such three-dimensional stress steering structures are shown in FIGS. 1-4.

The preforms may be sacrificial (i.e., preliminary), permanent, or a combination thereof. In sacrificial preforms, the bead material which forms the voids is eliminated at some point after incorporation into the base material, generally during further processing. In permanent preforms, the bead material remains in the voids, although it may be altered or reformed in some way during processing.

The beads of the preforms may be of any shape and size required to produce a desired engineered material, and may be hollow or solid, and any combination thereof. Generally, the beads are shaped such that they will produce a void having a particular void volume and/or shape after processing.

The beaded preforms are preferably made in one of two basic forms: filaments and mats, either of which may be rigid or flexible. These preforms may be further assembled into tows and laminates by applying a coating to the filaments and mats, respectively.

Figure 1:
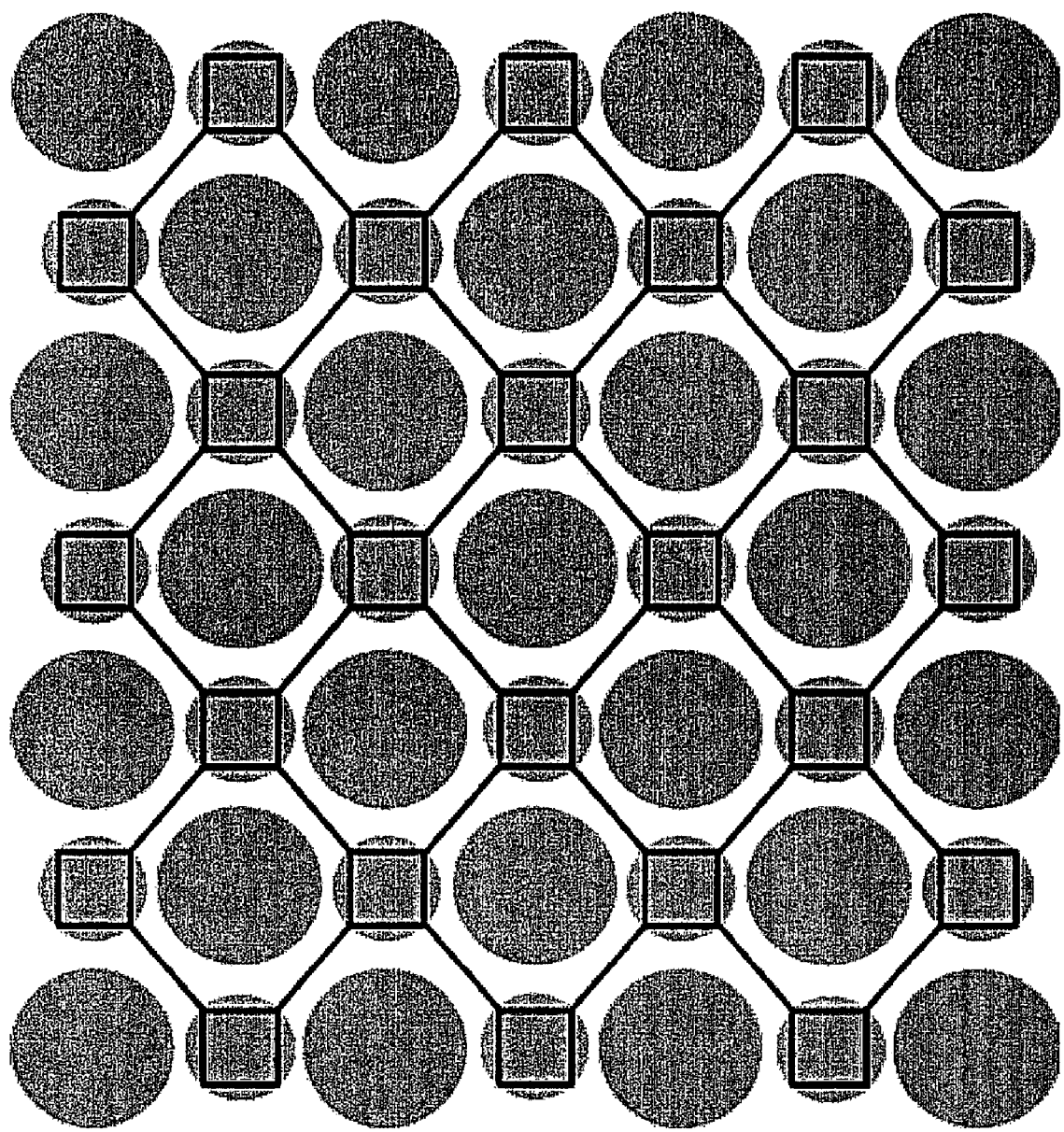
FIG. 1 illustrates a first, closed cell architecture of a stress steering structure created by preforms according to the present invention, in which all of the figurative TRDs have a void at their respective centers.
Figure 2:
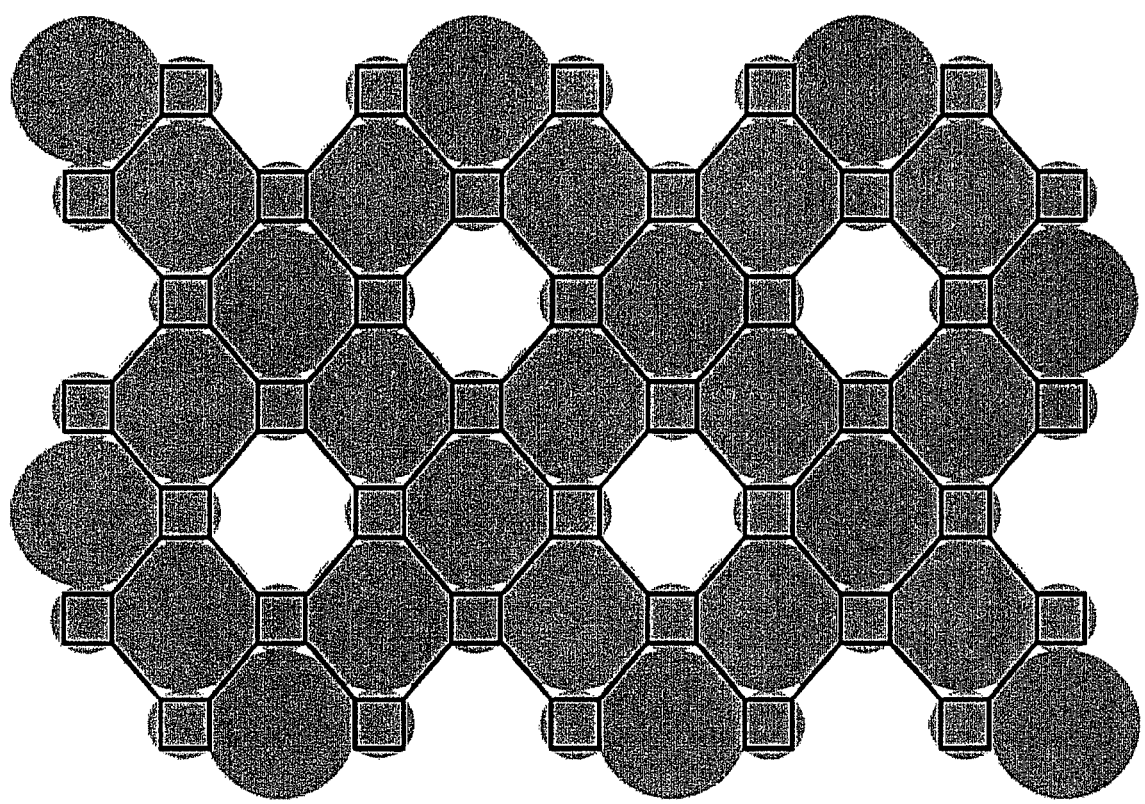
FIG. 2 illustrates a second, open-cell architecture of a stress steering structure created by preforms according to the present invention, in which every other figurative TRD is removed.
Figure 3:
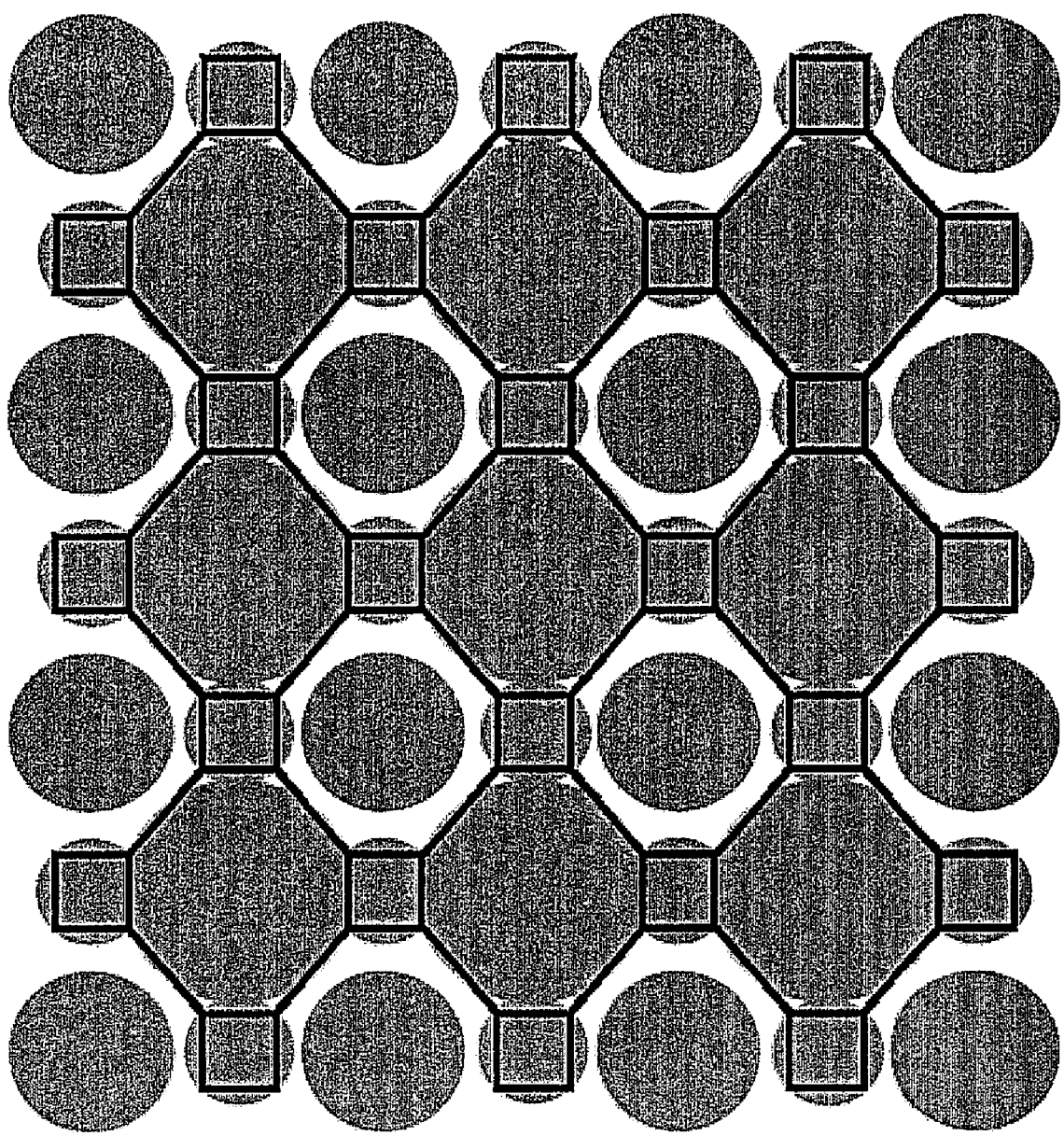
FIG. 3 illustrates a third, combination, open-cell, closed cell architecture of a stress steering structure created by preforms according to the present invention, in which figurative TRDs have a void at their respective centers.
Figure 4:
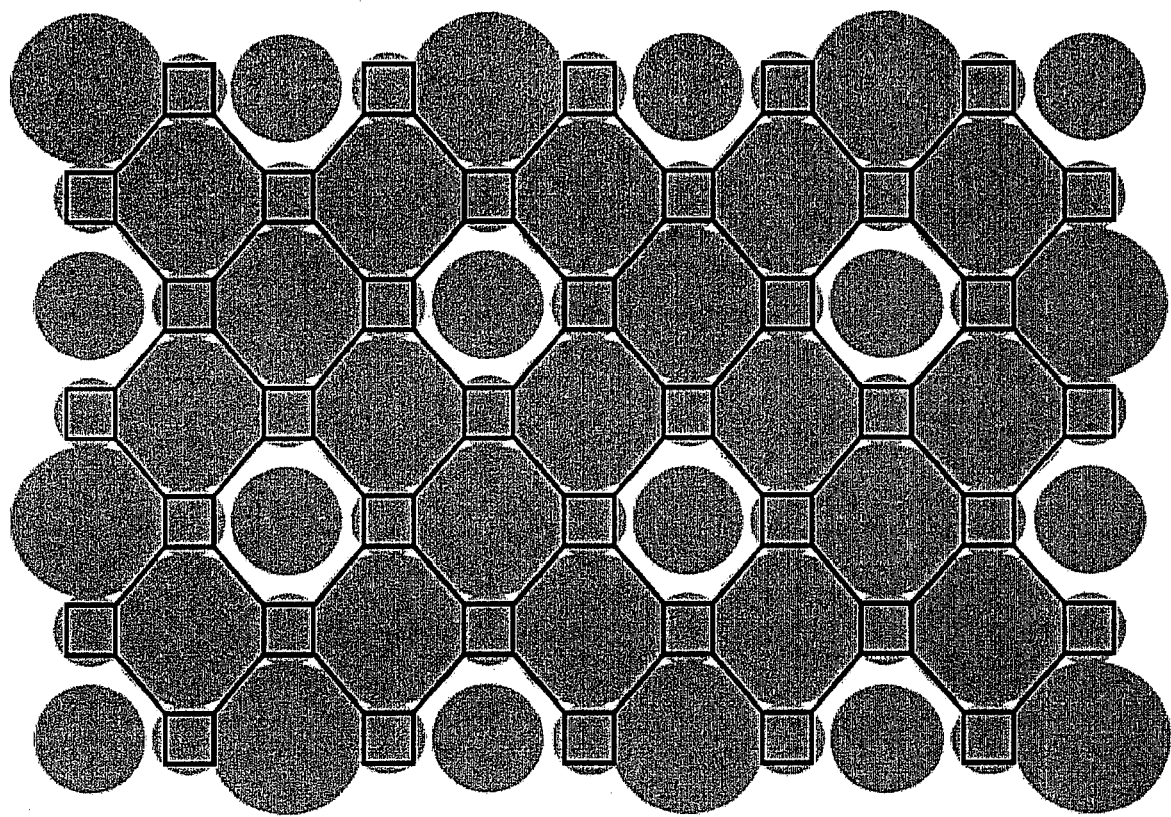
FIG. 4 illustrates a fourth, combination, open-cell, closed cell architecture of a stress steering structure created by preforms according to the present invention, in which figurative TRDs have a void at their respective centers.
Figure 5A:
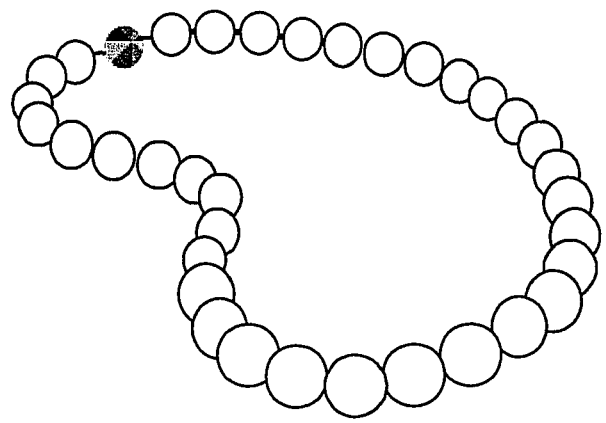
FIG. 5A illustrates a string of pearls which resemble a preform according to the present invention.
Figure 5B:
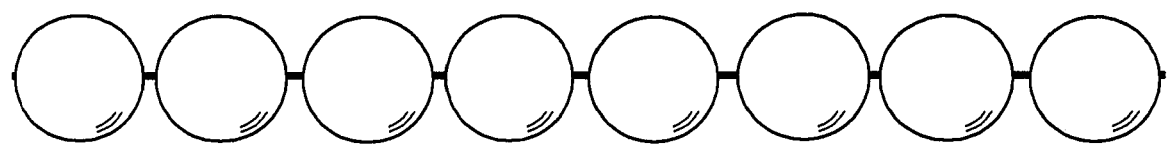
FIG. 5B illustrates a schematic view of a beaded filament preform according to a first embodiment of the present invention.
Figure 6A:
FIG. 6A illustrates a schematic view of the beaded filament preform according to the first embodiment of the present invention, having a single sized bead positioned at a first spacing.
Figure 6B:
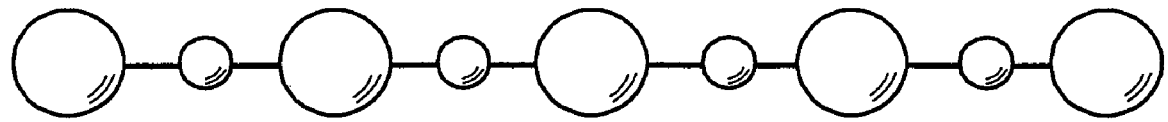
FIG. 6B illustrates a schematic view of the beaded filament preform according to the first embodiment of the present invention, having a larger sized bead interspaced between a smaller sized bead.
Figure 6C:
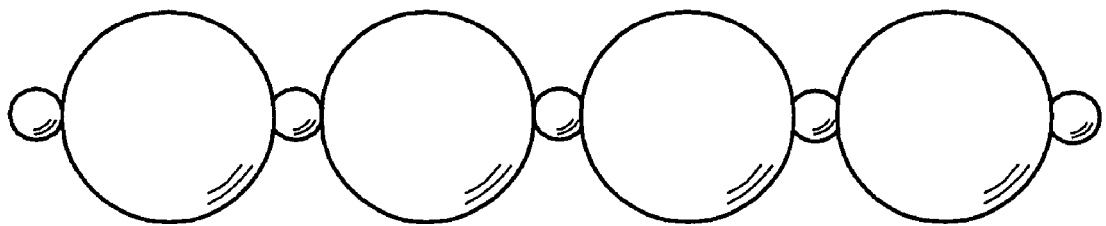
FIG. 6C illustrates a schematic view of the beaded filament preform according to the first embodiment, having a larger sized bead interspaced between a smaller sized bead, and positioned adjacent thereto.
Figure 7A:
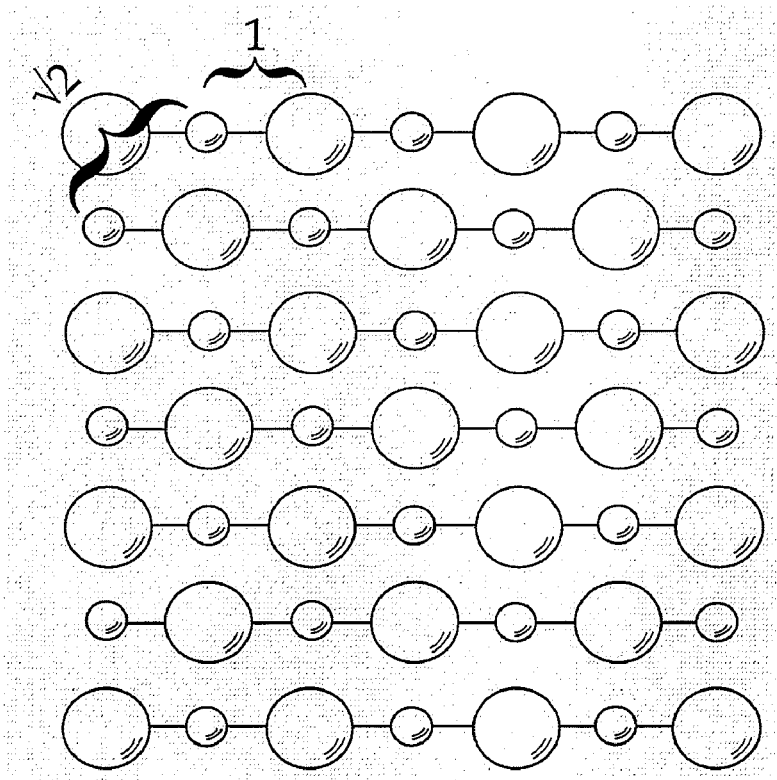
FIG. 7A illustrates a schematic view of the beaded filament preform according to the first embodiment of the present invention, where filaments are horizontally arranged in a grouping typical of a laminate material.
Figure 7B:
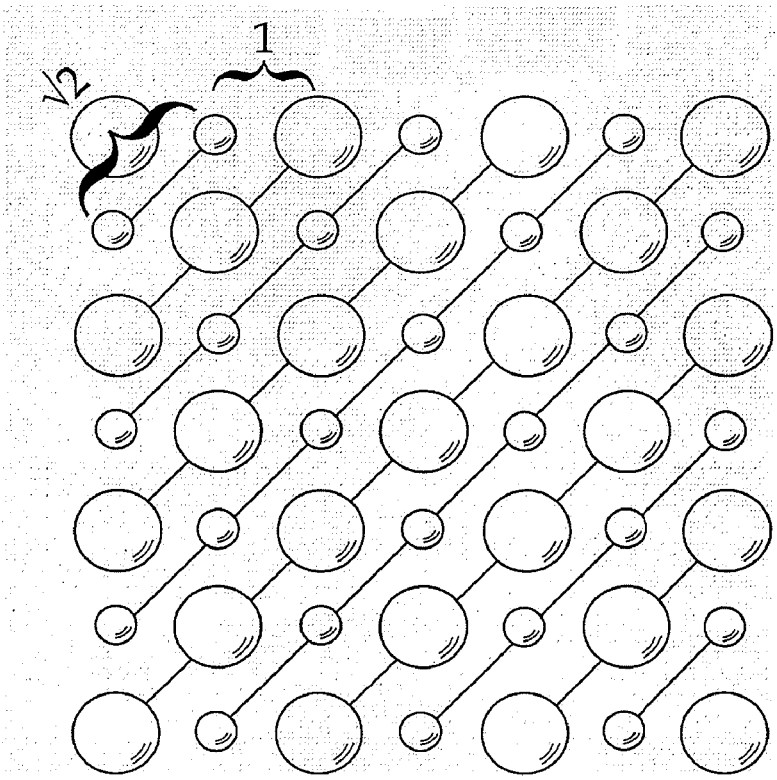
FIG. 7B illustrates a schematic view of the beaded filament preform according to the first embodiment of the present invention, where filaments are diagonally arranged in a grouping typical of a laminate material.
Figure 7C:
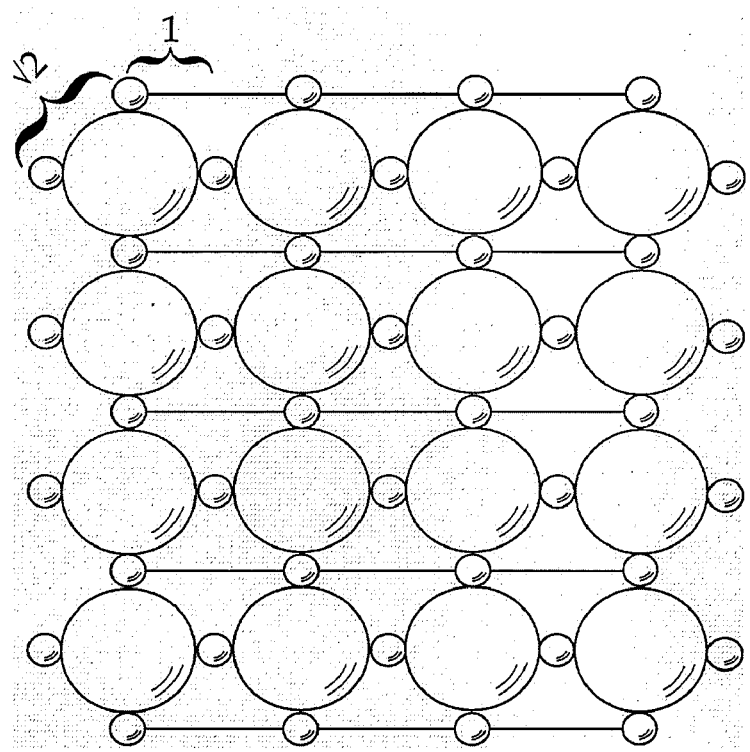
FIG. 7C illustrates a schematic view of the beaded filament preform according to the first embodiment of the present invention, where filaments are horizontally arranged in a grouping typical of a laminate material, and where two different sized beads are used.
Figure 7D:
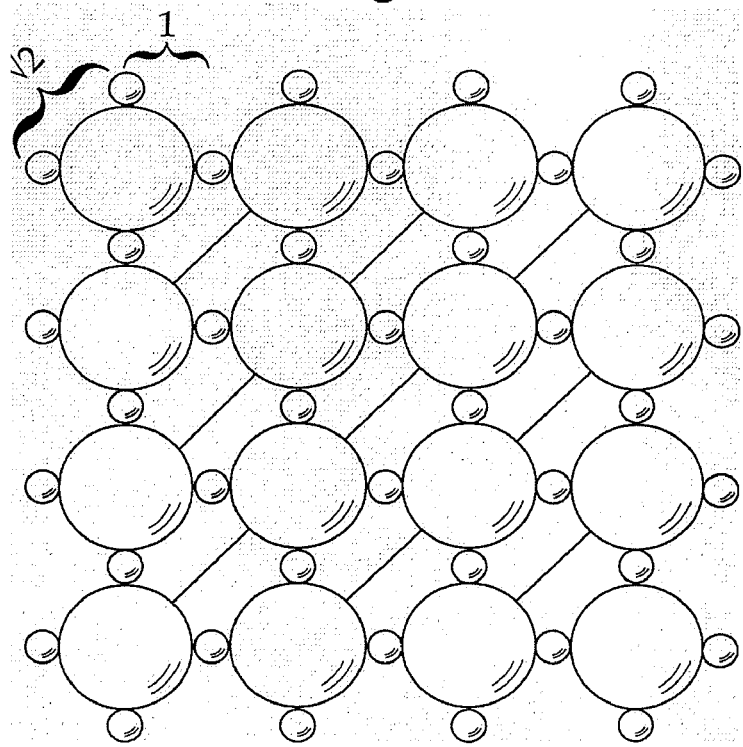
FIG. 7D illustrates a schematic view of the beaded filament preform according to the first embodiment of the present invention, similar to FIG. 7C, except the filaments are diagonally arranged.

A filament 2 preform according to the present invention is similar to a strand of beads (FIG. 5A) and comprises a strand 4 of spaced apart beads 6 (FIG. 5B). The spacing may be asymmetrical, but is generally organized and/or symmetrical, with a pattern of predetermined distances. Moreover, the beads may be equally sized, randomly sized, or (also) a repeating pattern of particularly shaped beads as shown in FIGS. 6A-6C.

Mats 8 are two-dimensional arrays of assembled filaments 2 as shown in FIGS. 7A-7D, although they may be formed by assembling a plurality of beads in other ways to form a two-dimensional array. As shown in the figures, vertical and horizontal spacing of the beads are generally provided in an organized, predetermined distance and pattern.

Figure 8:
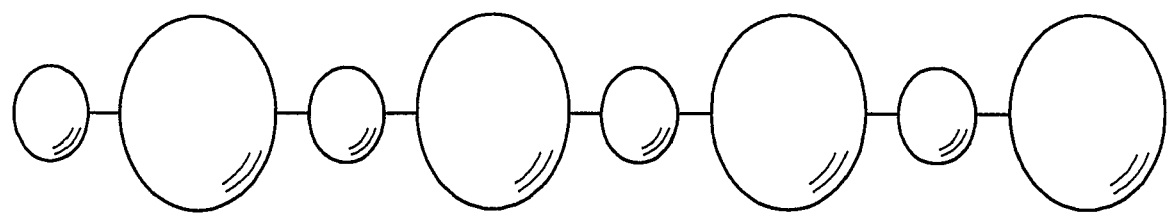
FIG. 8 illustrates a schematic view of the beaded filament preform according to the first embodiment of the present invention, illustrating beads of a filament prior to processing within a material having an oblong shape so that a properly shaped spherical void will be formed as a result.

FIG. 8 illustrates a beaded filament having oblong shaped beads. The beads are formed in such shapes so that when incorporated into a particular material, the voids, and thus the beads themselves if permanent, end up having a spherical shape after processing. Such processing which benefits from these types of filaments may be a casting process, where high temperatures and/or compression rolling effect the shape of the preform, and thus, the shape of the void created whether or not the preform is sacrificial or not.

Figure 9:
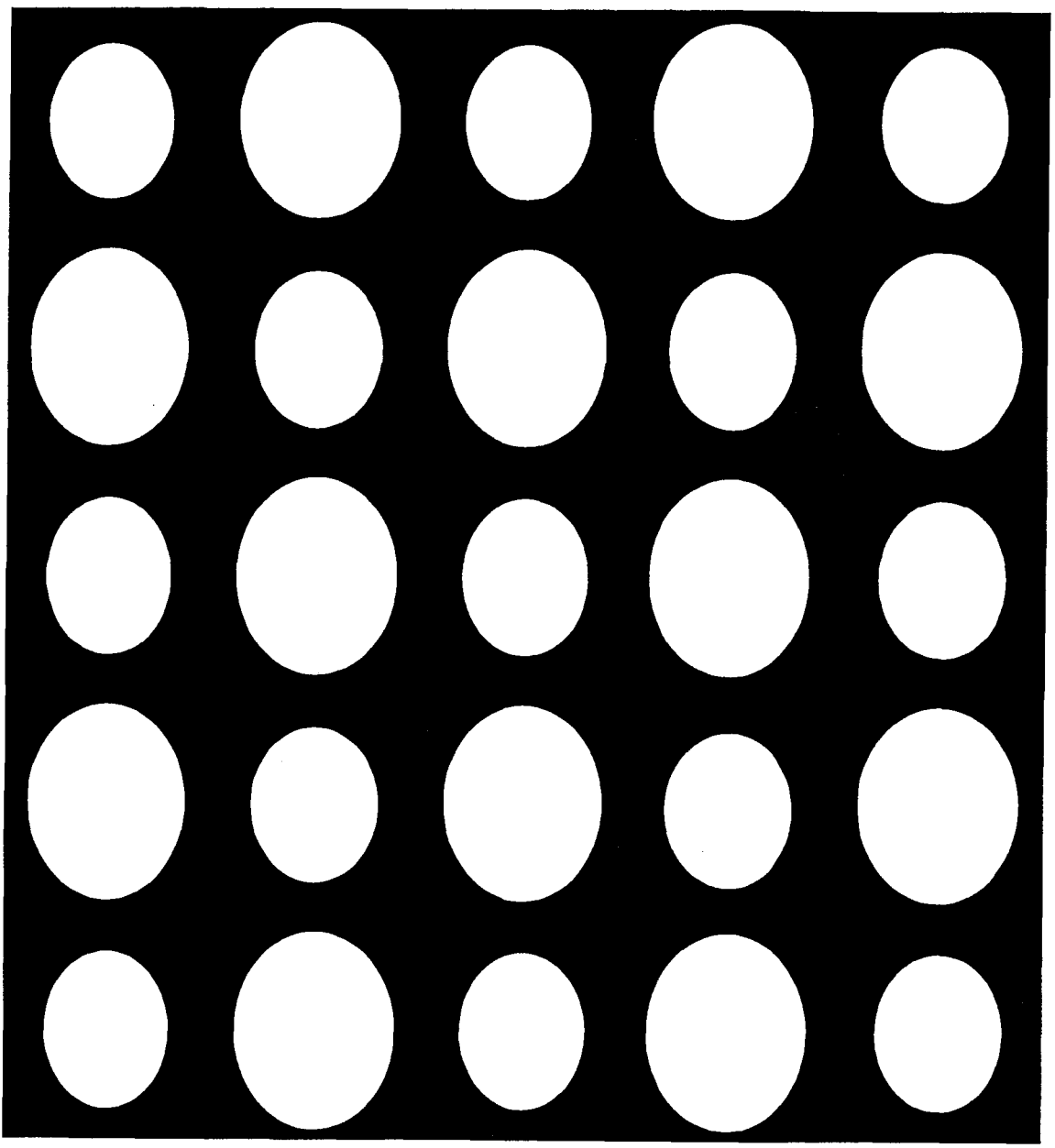
FIG. 9 illustrates a cross-sectional view of an engineered material manufactured by assembling together a plurality of filaments according to the first embodiment of the present invention.
Figure 10:
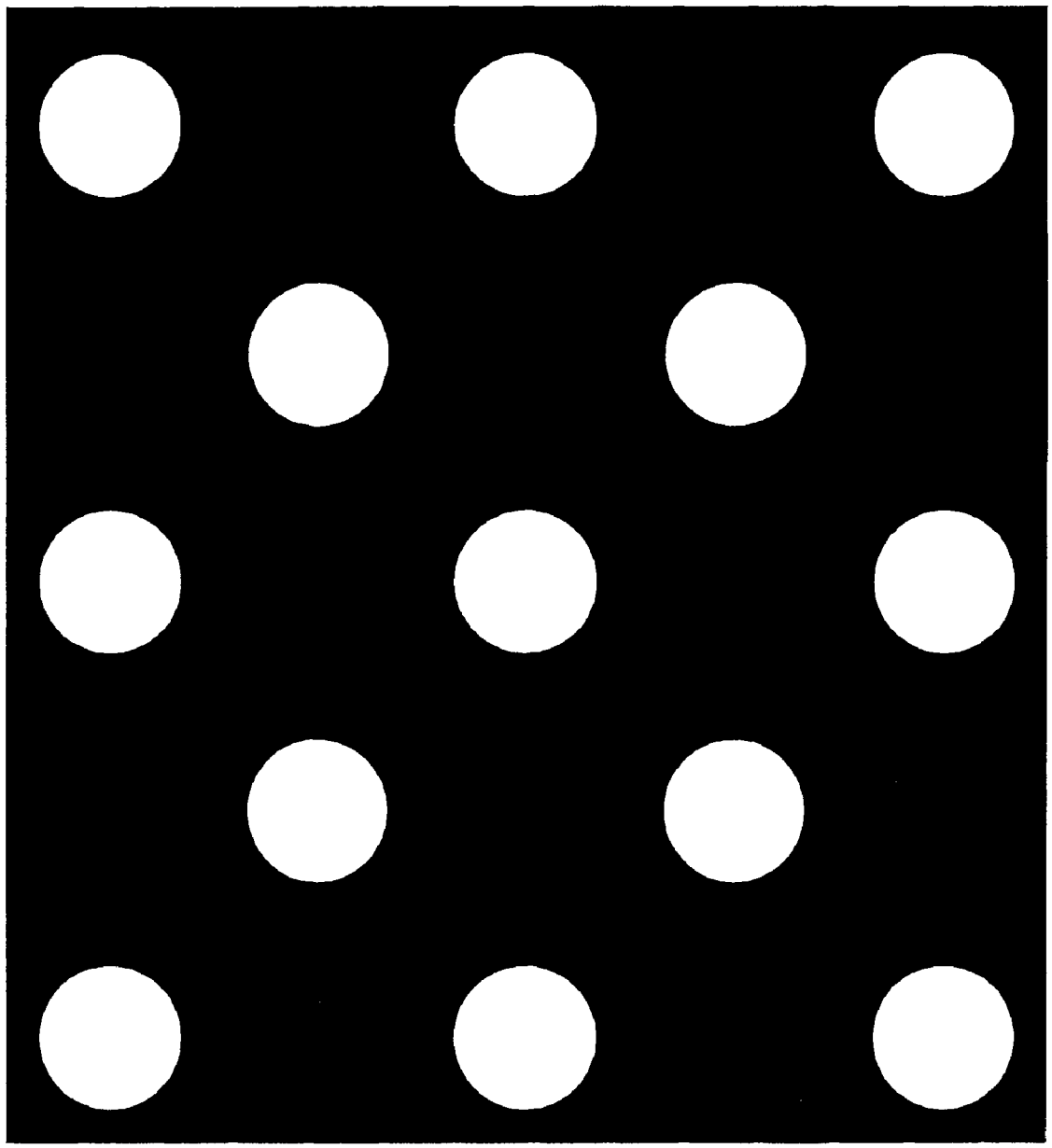
FIG. 10 illustrates a cross-sectional view of another engineered material manufactured by assembling together a plurality of filaments according to the first embodiment of the present invention.
Figure 14:
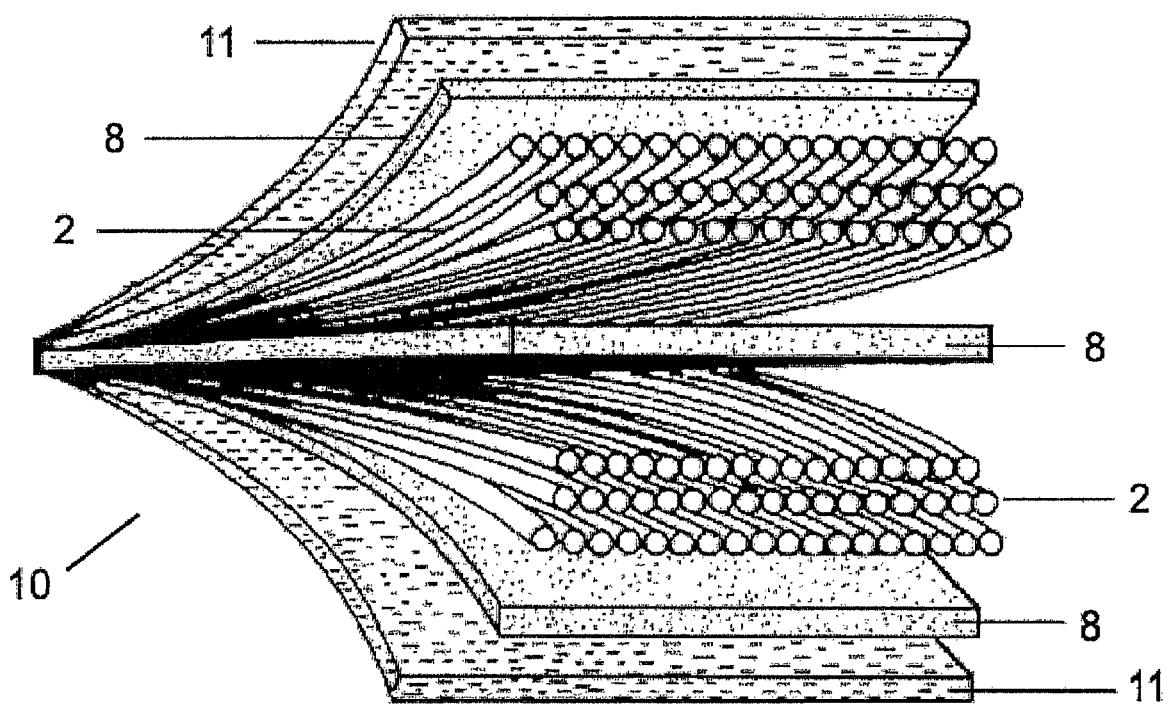
FIG. 14 illustrates beaded filaments and mats aligned for processing to form a laminate/fabric.

Mats and filaments may be assembled to form a fabric, resulting in, for example, material cross-sections illustrated in FIGS. 9-10 having voids 12 and 14 (FIG. 9) and voids 16 (FIG. 10). As shown in FIG. 14, such a fabric laminate may include alternating layers of mats 8 and filaments 2 with a surface material 11 covering the top and bottom.

Figure 11A:
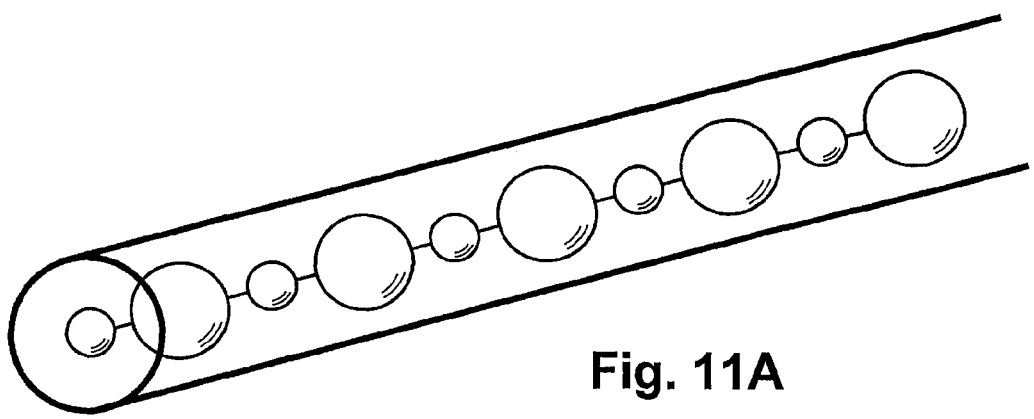
FIG. 11A illustrates a cylindrical tow using a filament preform according to the first embodiment of the present invention.
Figure 11B:
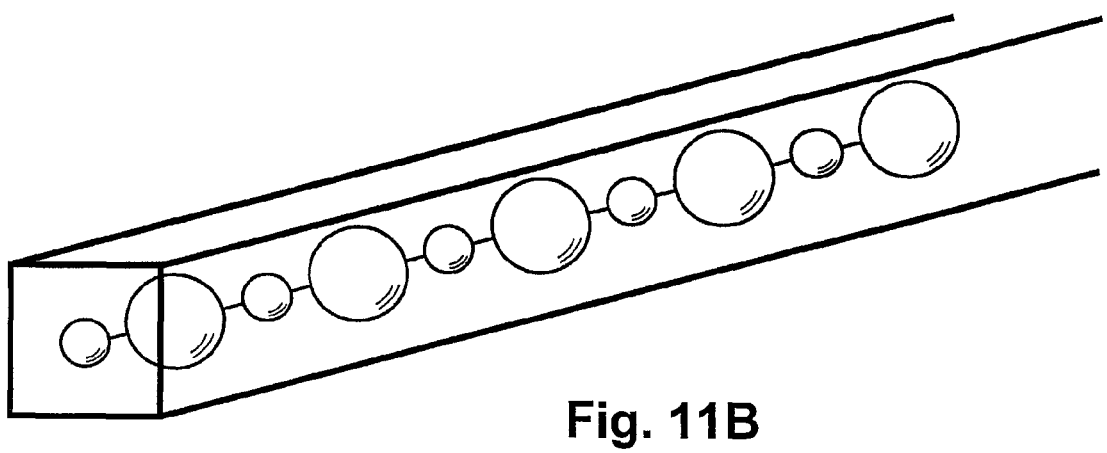
FIG. 11B illustrates a square-column tow using a filament preform according to the first embodiment of the present invention.
Figure 12A:
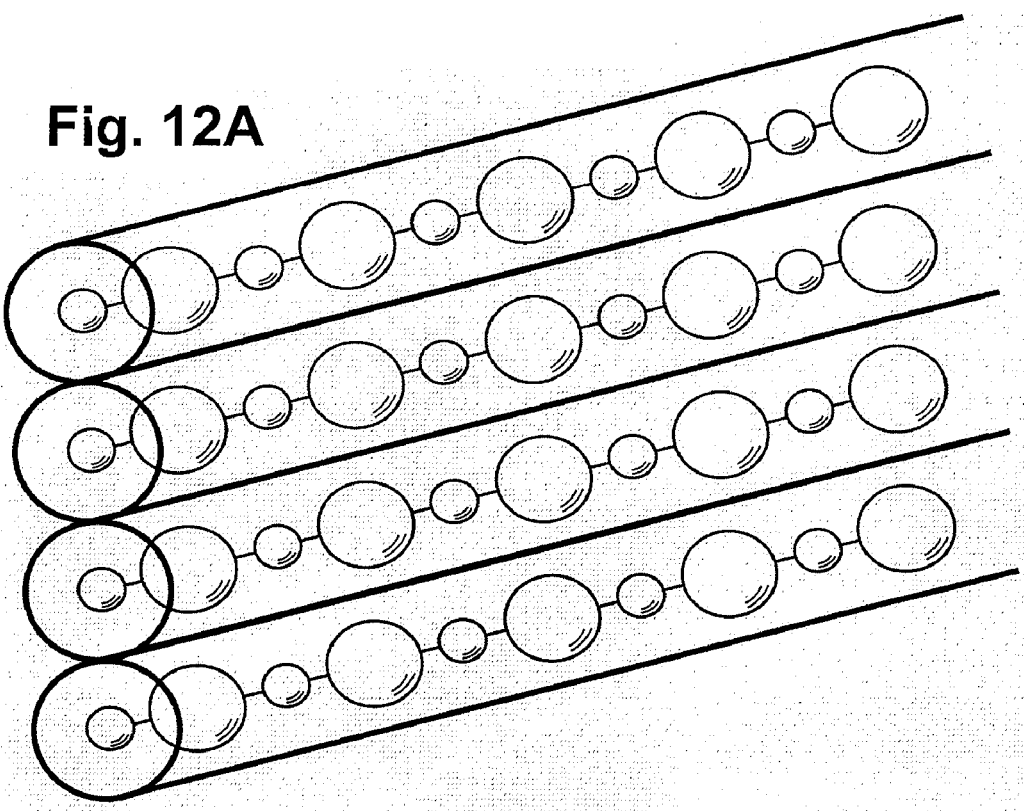
FIG. 12A illustrates a laminate manufactured by assembling a plurality of tows as illustrated in FIG. 11A.
Figure 12B:
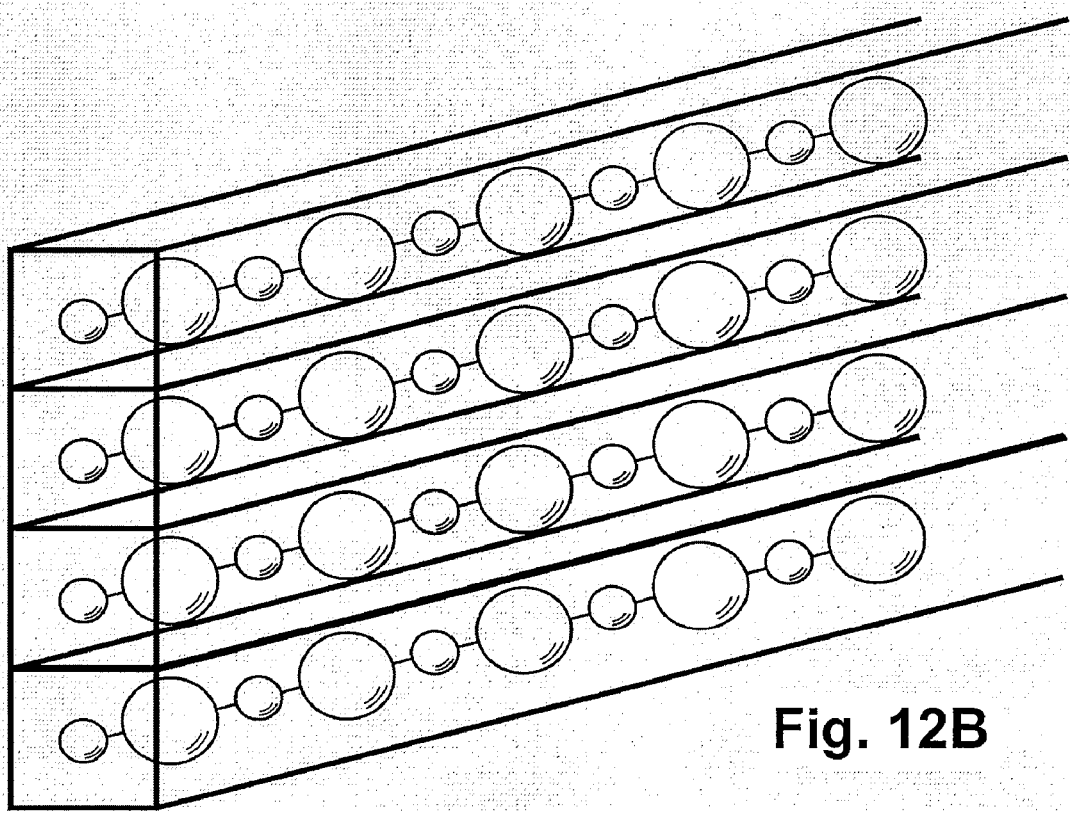
FIG. 12B illustrates a laminate manufactured by assembling a plurality of tows as illustrated in FIG. 11B.
Figure 13A:
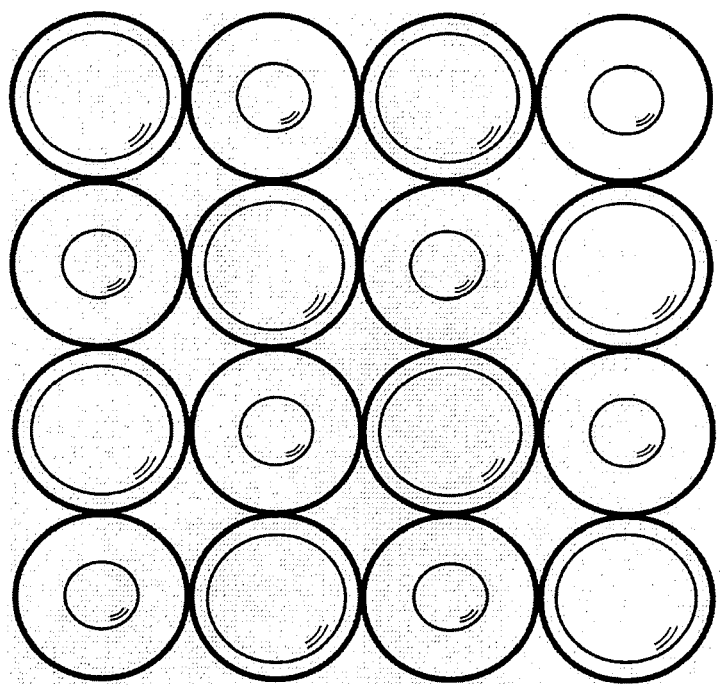
FIG. 13A illustrates a plurality of tows, as shown in FIG. 11A, assembled to form a fabric.
Figure 13B:
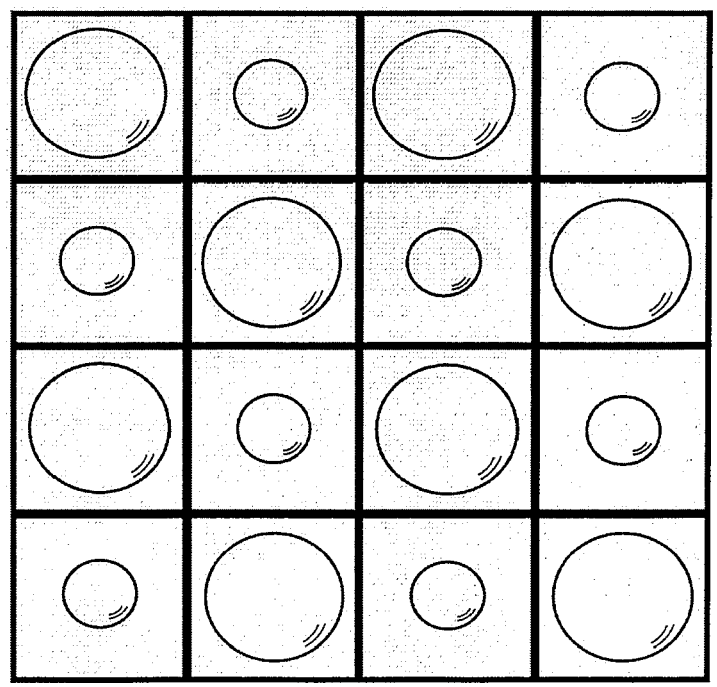
FIG. 13B illustrates a plurality of tows, as shown in FIG. 11B, assembled to form a fabric.
Figure 13C:
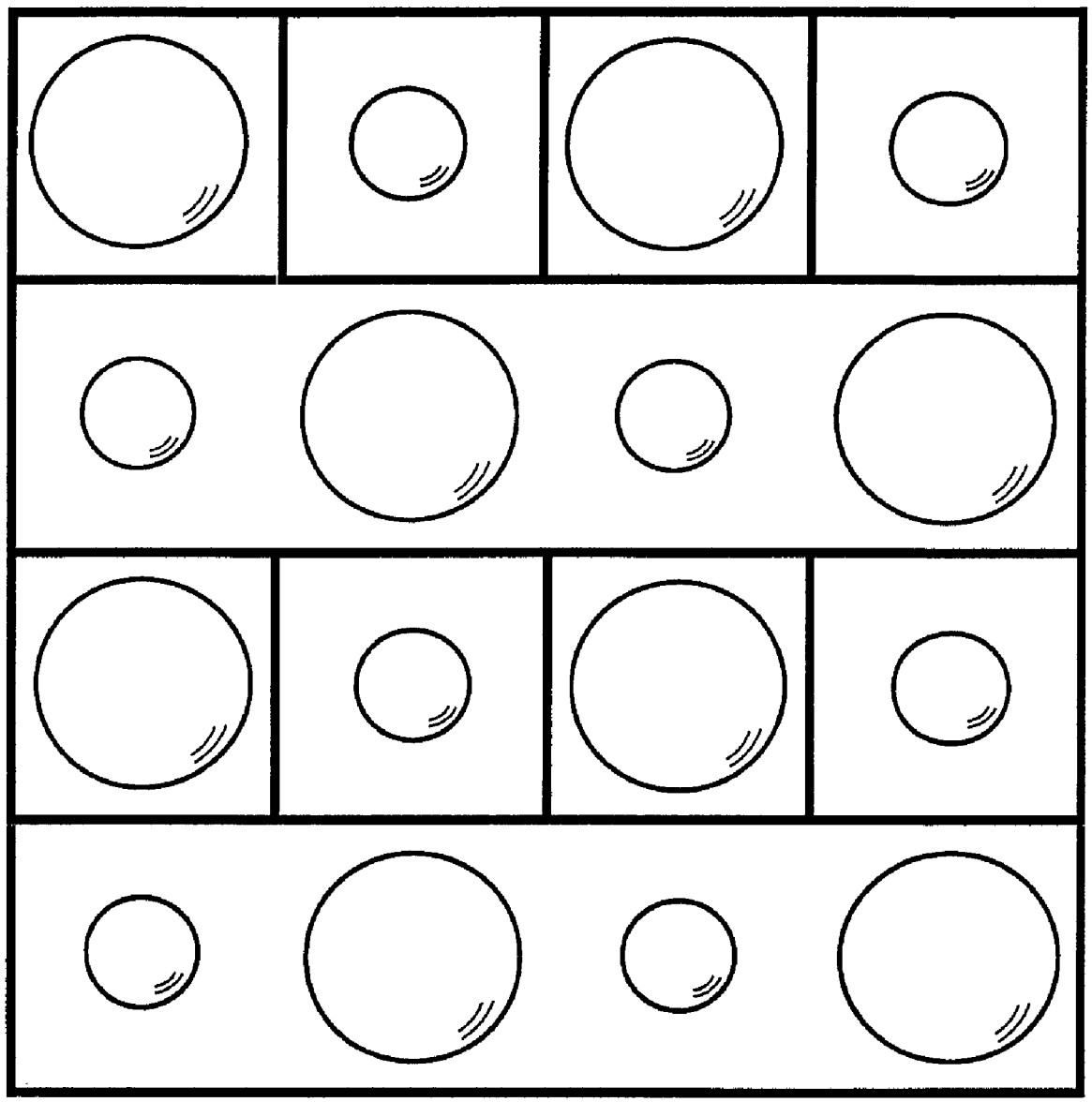
FIG. 13C illustrates a plurality of tows and laminates assembled together to form a fabric.
Figure 13D:
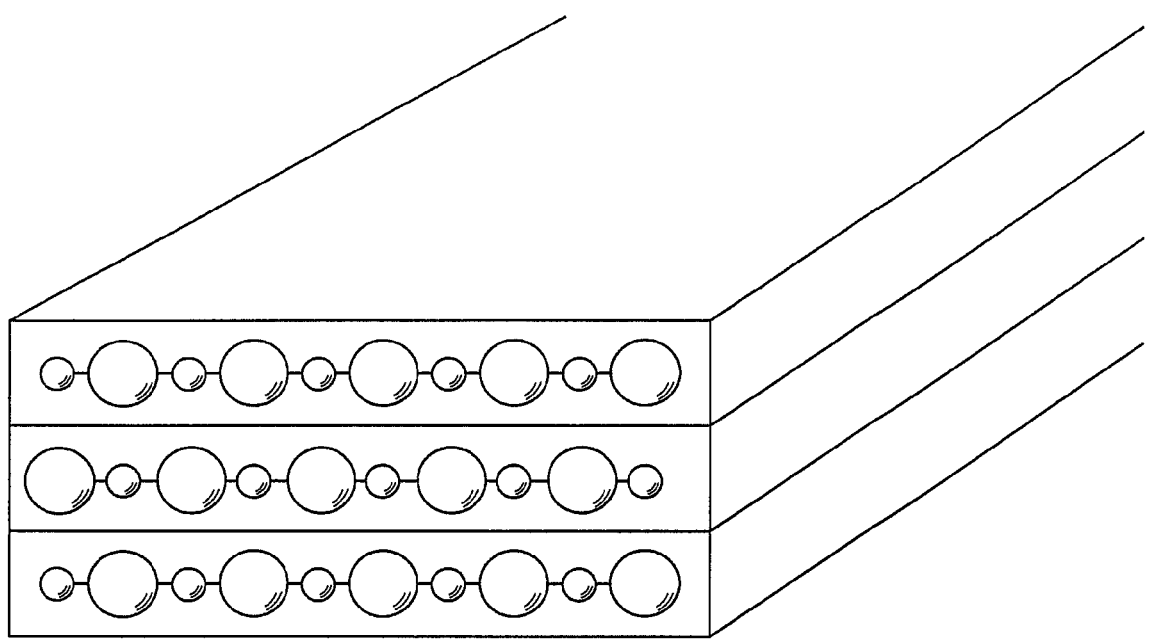
FIG. 13D illustrates a plurality of laminates.

Tows 18 (FIGS. 11A-11B) are formed by coating a filament 2, generally, with a type of matrix material (e.g., thermosetting resin) 3. Similarly, laminates 20 are generally formed by coating a mat with a matrix material, or may be manufactured by assembling a plurality of tows 2 (FIGS. 12A-12B), or by coating an assemblage of a plurality of filaments arranged in an array.

Tows and laminates, as well as filaments and mats, may also include cutting and positioning guides (e.g., recesses, protrusions), so that they may be easily cut, arranged and assembled for a particular application in intermediate and final product materials.

Intermediate and final products may be manufactured from composites 22 of tows and laminates (FIGS. 13A-13D, and 14). For example, one way a composite fabric may be made is by weaving, knitting, and otherwise assembling together a plurality of tows, a plurality of laminates, or a combination thereof.

Figure 29:
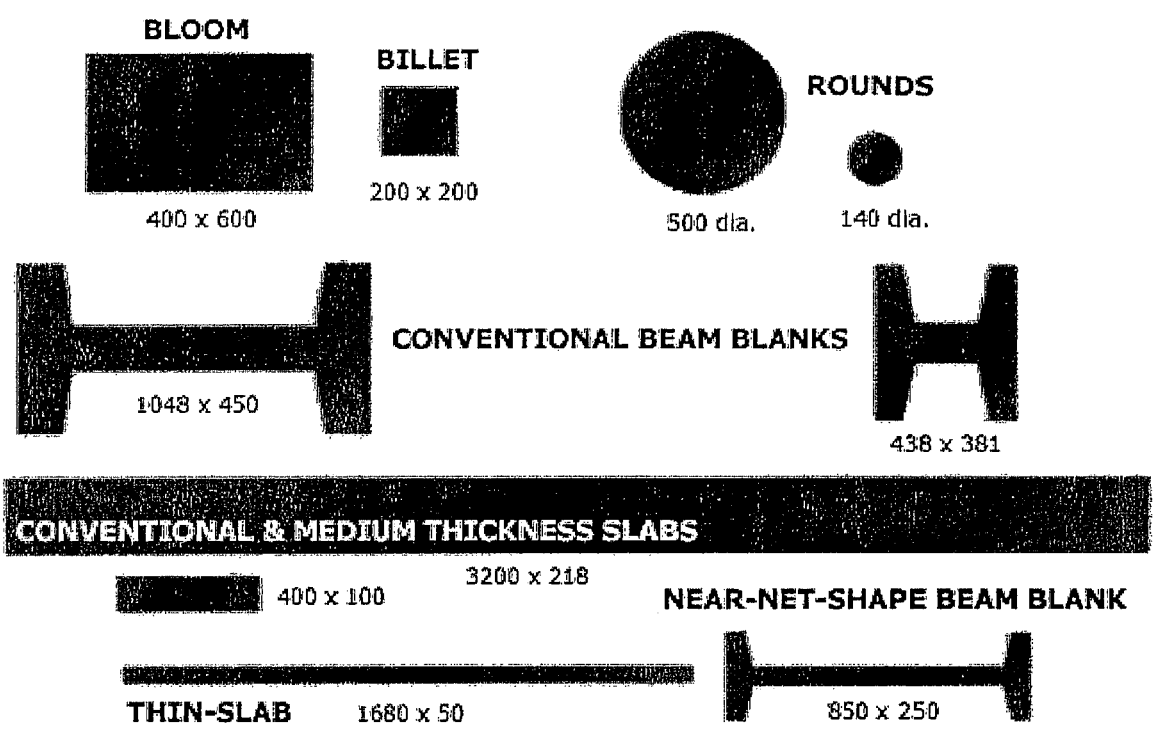
FIG. 29 illustrates various structures capable of being manufactured using the preform materials according to the first and second embodiments of the present invention.

Composites, including fabrics, may be continuous (e.g., tapes) and discontinuous and may be manufactured for both intermediate materials and finished products. For example, composites may be manufactured into slabs, blooms, billets, panels, boards, and sheets (see FIG. 29).

One skilled in the art will appreciate that the void pattern of material (e.g., a stress steering structure) may be incorporated into a fabric by weaving, braiding, and knitting tows, such that the advantages of this structure are captured at two different levels. Moreover, the structure and material of the beads and coatings may be comprised of stress steering structures (i.e., voided structures) such that, the advantages of the stress steering structures are now captured at three levels.

Accordingly, there are numerous possible and potential matrices for tows, laminates, and fabrics for the present invention using metals, plastics, ceramics, and various alloys, mixtures and composites thereof. Alternative materials include semiconductors, textiles, paper, and biomaterials.

A void created by a preform component may be used to house devices for intelligent materials for use in intelligent structures. Specifically, sensors, actuators, MEMS, and other devices may be incorporated within a void of a structural element of a bridge, or a wing of an aircraft, for example, to supply information regarding the performance of the element/bridge or to induce an internal force on the structure to change its shape or change a characteristic of the element (e.g., change the shape of the wing of an aircraft to create more lift). To incorporate such a device into an end product, the device may be used in place of one or more of the beads in a filament or mat or incorporated in one or more of the beads.

The preforms according to the present invention are produced using conventional manufacturing processes. Accordingly, Applicant has provided a comprehensive list of manufacturing processes which may be used to manufacture the preforms according to the present invention, examples of which are illustrated in FIGS. 15-18. These include various casting, deformation, and forming processes for metals; blow molding, compression molding (cold/hot), transfer molding, cold molding, injection molding, reaction injection molding, thermoforming, rotational molding, and foam molding for plastics; pressure casting, slip casting, isostatic pressing, plasma spray forming, roll pressing, injection molding, and gelcasting for ceramics; and infiltration casting, filament winding, and isostatic pressing for composites.

Figure 15:
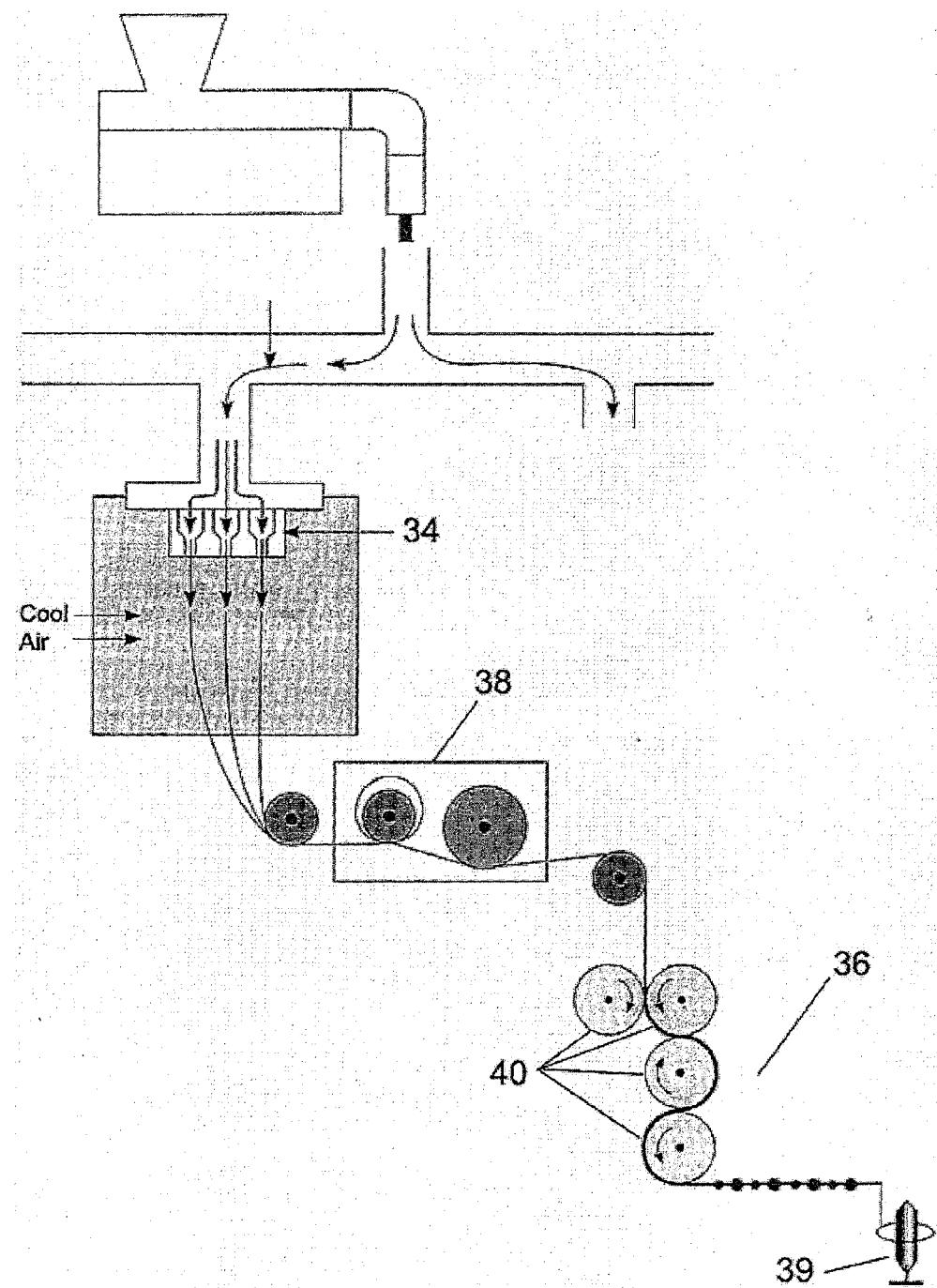
FIG. 15 illustrates an first extrusion/spinning process for manufacturing the beaded filament preform according to the present invention.

One example of producing the novel preforms according to the present invention is shown in FIG. 15 and is described as follows.

Figure 16:
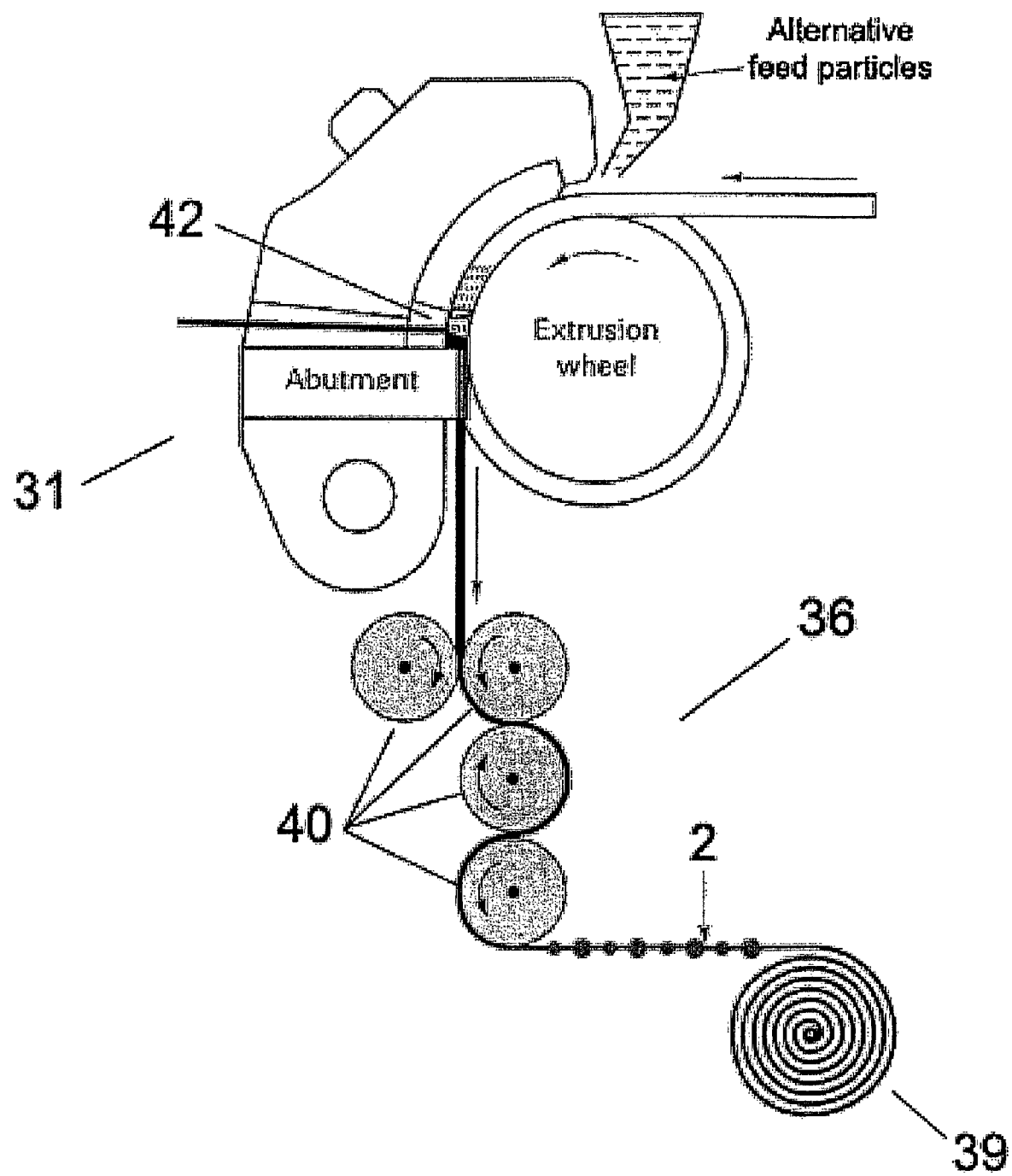
FIG. 16 illustrates a second extrusion process for manufacturing the beaded filament preform according to the present invention.

Filaments: As shown in FIG. 15 and FIG. 16, filaments may be produced by a spinning process 31, in which extruded material is forced through a die 32 (spinneret) containing many small holes 34. The beads are added thereafter by shape rolling 36, or preferably by inline drawing 38 and calendaring operations on the filaments with embossed rollers 40. Drawing thins the filaments thereby increasing their tensile strength in anticipation of further processing. The finished filaments are gathered on a take up spool 39. Filaments may also be produced by using rotary extrusion as shown in FIG. 16.

Figure 17:
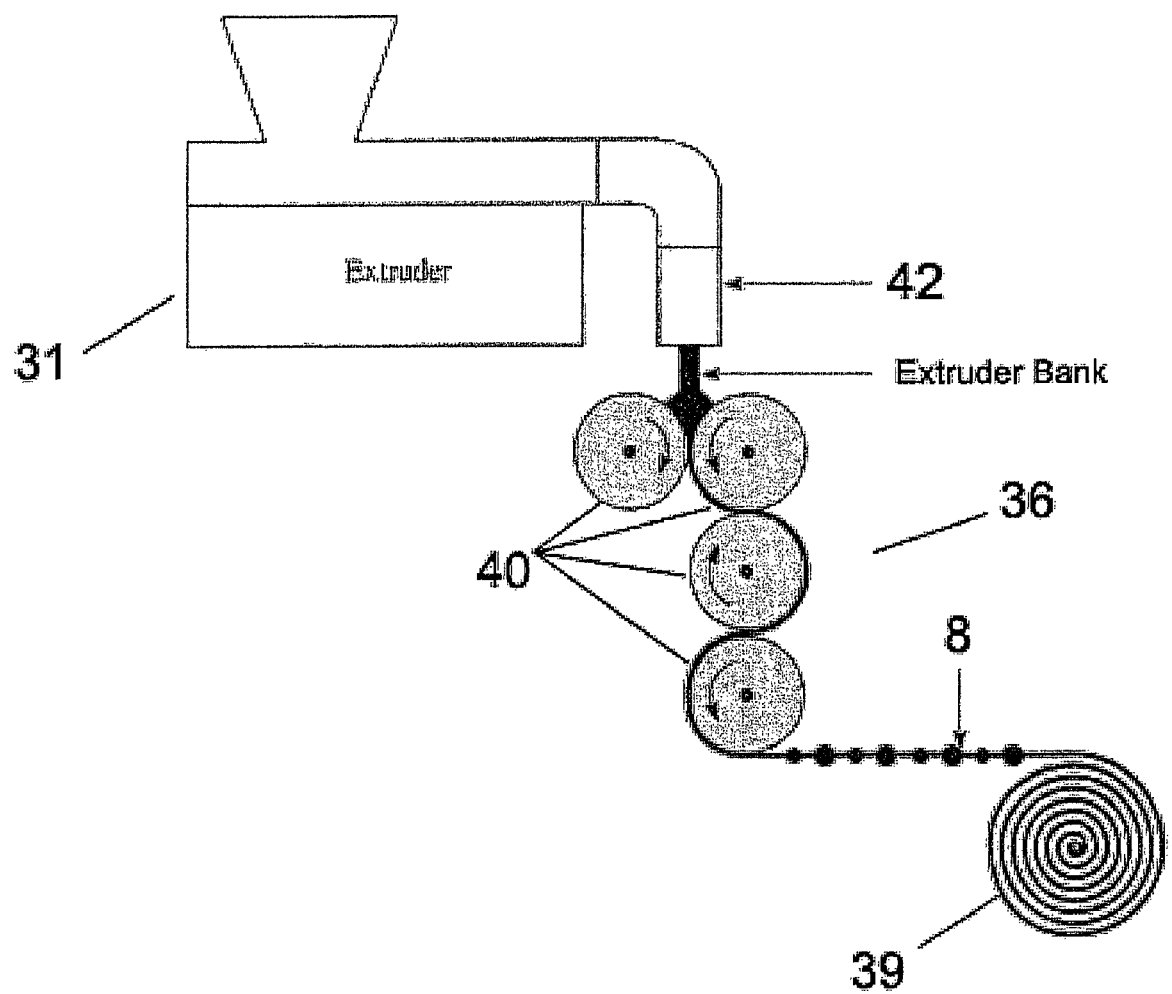
FIG. 17 illustrates a first extrusion process for manufacturing the beaded mat preform according to the present invention.
Figure 18:
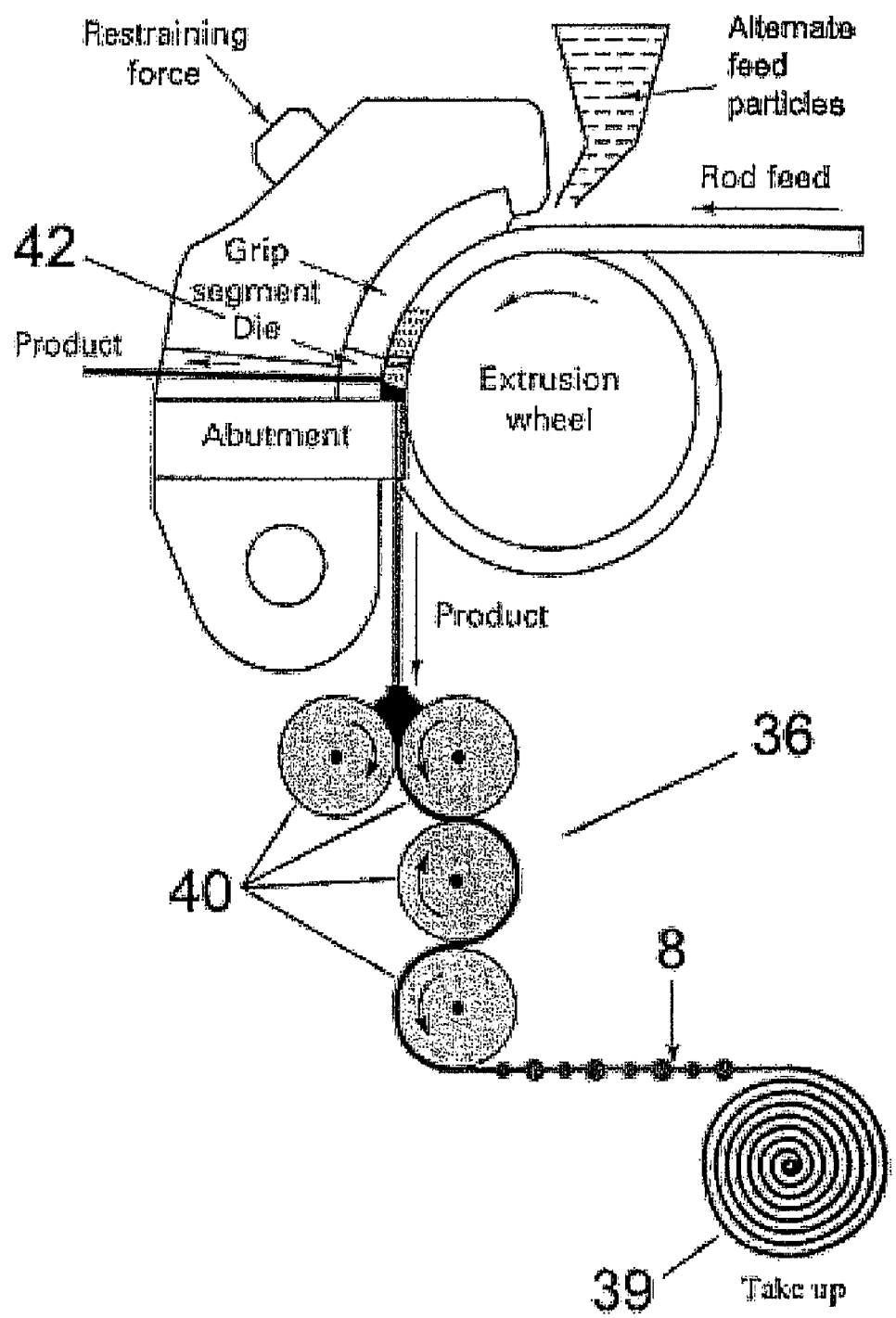
FIG. 18 illustrates a second extrusion process for manufacturing the beaded mat preform according to the present invention.

Mats: Mats generally begin as extruded tape castings with beading added inline by calendaring with embossed rollers (as preferably done with filaments) as shown in FIGS. 17-18. As shown, material is extruded out an extruder die 42 to produce a mat of material containing no beads. From there the 2D array enters into a calendaring operation, which adds beads with embossed rollers 40. However, beaded filaments may be used to form the mats by organizing a plurality of filaments into a mesh or by properly aligning a plurality of filaments in an array with an extruded matrix material. The latter process is similar to continuous preform casting (see below). The matrix material may include a reinforcement material and may also be a composite.

Figure 19:
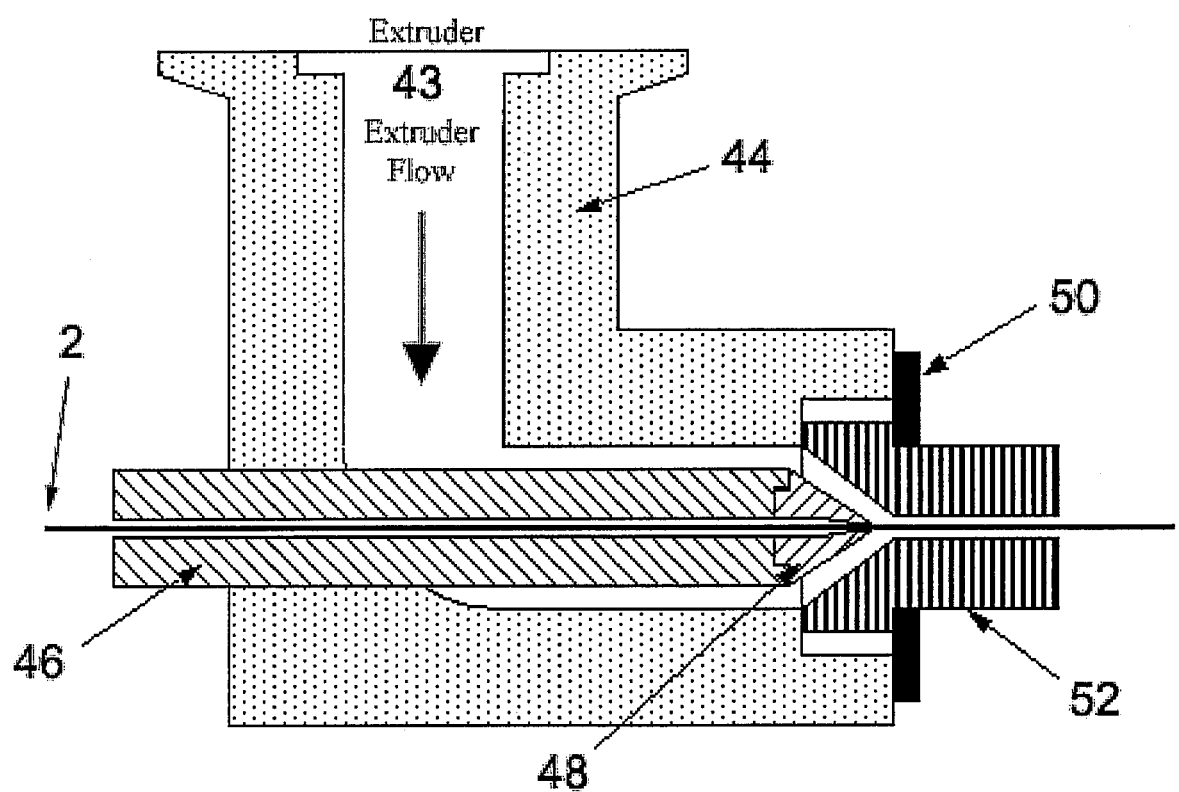
FIG. 19 illustrates a first extrusion process for manufacturing a tow according to the present invention.
Figure 20:
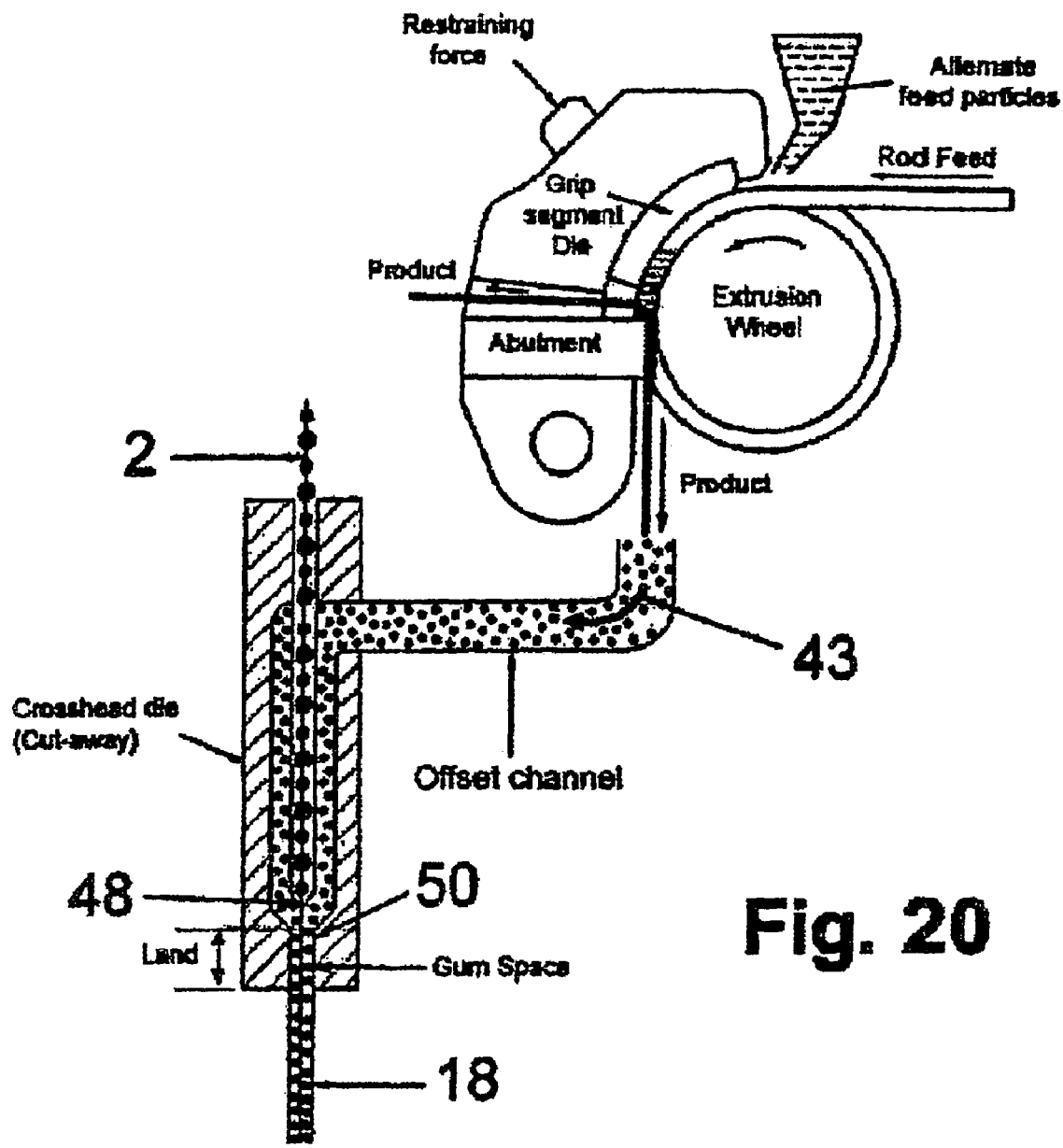
FIG. 20 illustrates a second extrusion process for manufacturing a tow according to the present invention.

Tows: Tows generally begin as beaded filaments and are generally formed inline in an extruding operation, for example, by coating filaments with an extruded matrix material as shown in FIGS. 19 and 20. Such processes are commonly used for wire and cable coating. The extruded coating material 43 is applied to a beaded filament 2 in a die body 44. The filament is introduced into the die body through a core tube 46. A guider tip 48 aligns the beaded filament 2 within an opening 50 of a die 52. Unconsolidated tows may then be superimposed (or otherwise organized) and fused, joined, or bonded inline to form other preforms and structures such as laminates and fabrics.

Figure 21:
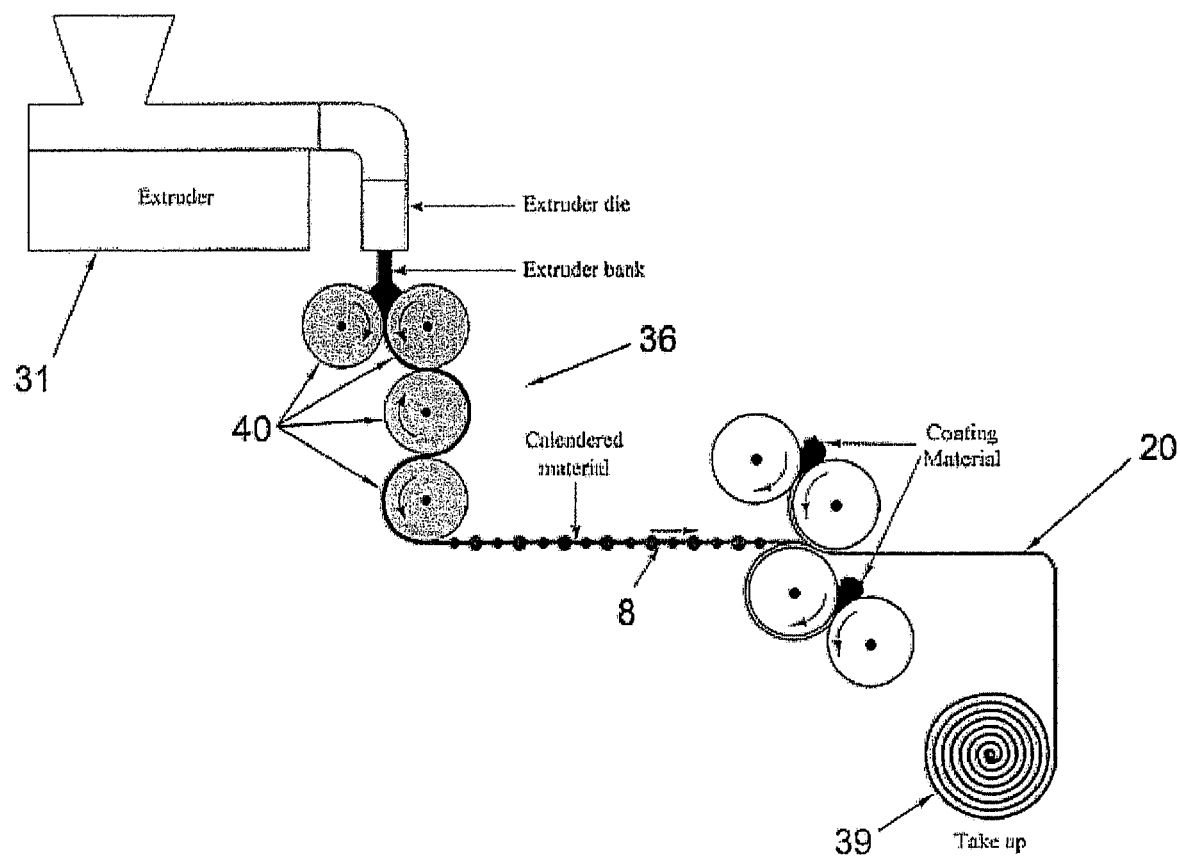
FIG. 21 illustrates a first extrusion process for manufacturing a laminate with the preform mat according to the present invention.
Figure 22:
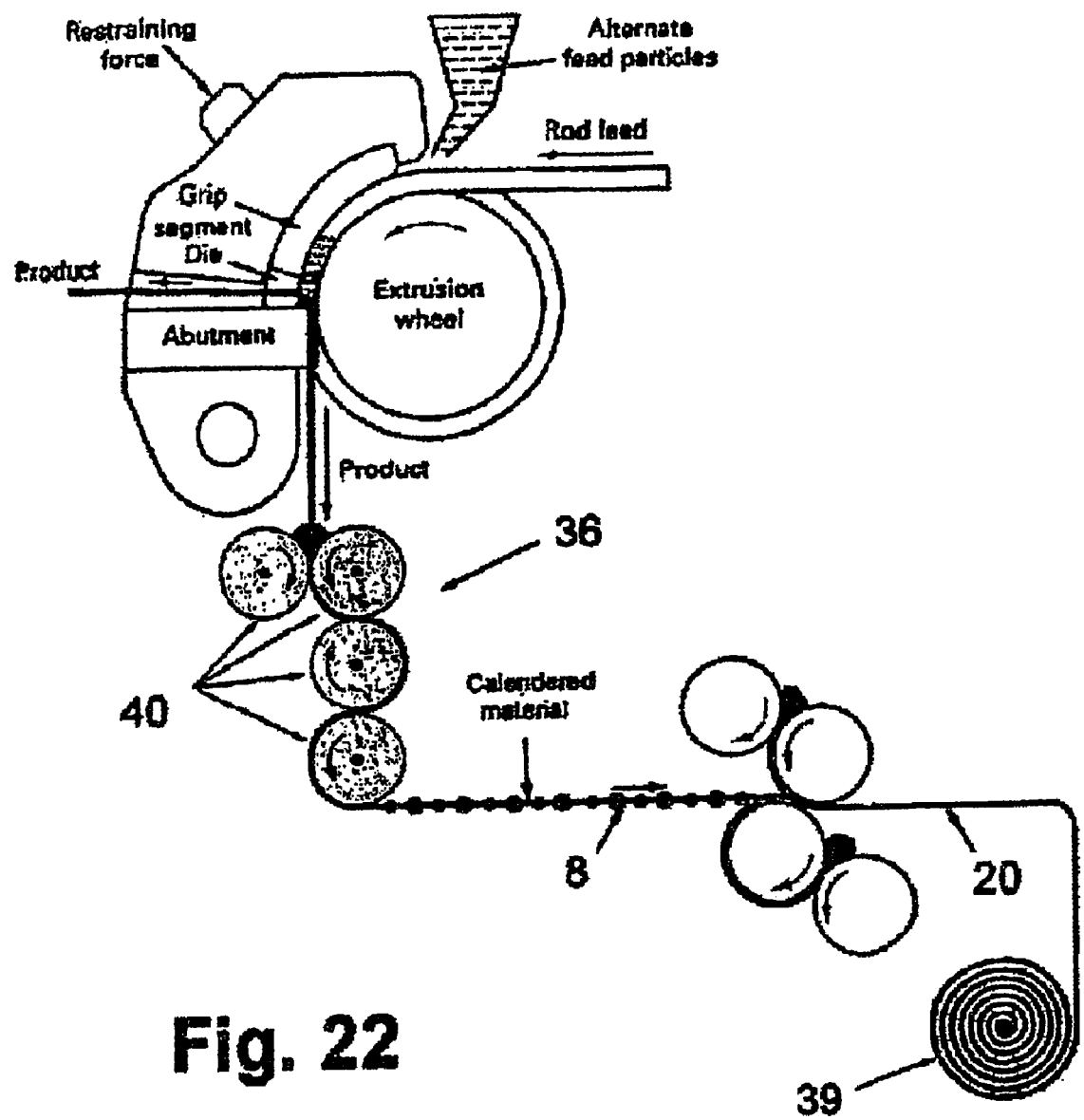
FIG. 22 illustrates a second extrusion process for manufacturing a laminate with the preform mat according to the present invention.

Laminates: Laminates generally begin as mats (or filaments/tows) and are generally formed inline in extruding operations as shown in FIGS. 21-22, for example, by coating mats with an extruded matrix material. Like tows, the coating material may also contain reinforcement material and may also be another form of composite. The coating material may also be applied in multiple layers, be functionally graded material, and be organized in a hierarchical structure.

Like tows, unconsolidated laminates may be superimposed and fused or otherwise bonded to form composites, other preforms, and structures such as fabrics. These combinations may be formed mechanically via inter-laminate connectors or mechanical fasteners (e.g., snap fits or tongues and grooves), or may be bonded via an adhesive, fusion bonding and welding (e.g., ultrasonic, microwave, rf welding, induction). It is worth noting that during the bonding process, sacrificial preforms are generally eliminated.

Plastic-matrix preform laminates may be melted slightly on their surfaces to achieve consolidation. In addition to being heated, superimposed metal-matrix preform laminates may be subjected to compression rolling to enhance consolidation as well as the quality of the final product.

Figure 23:
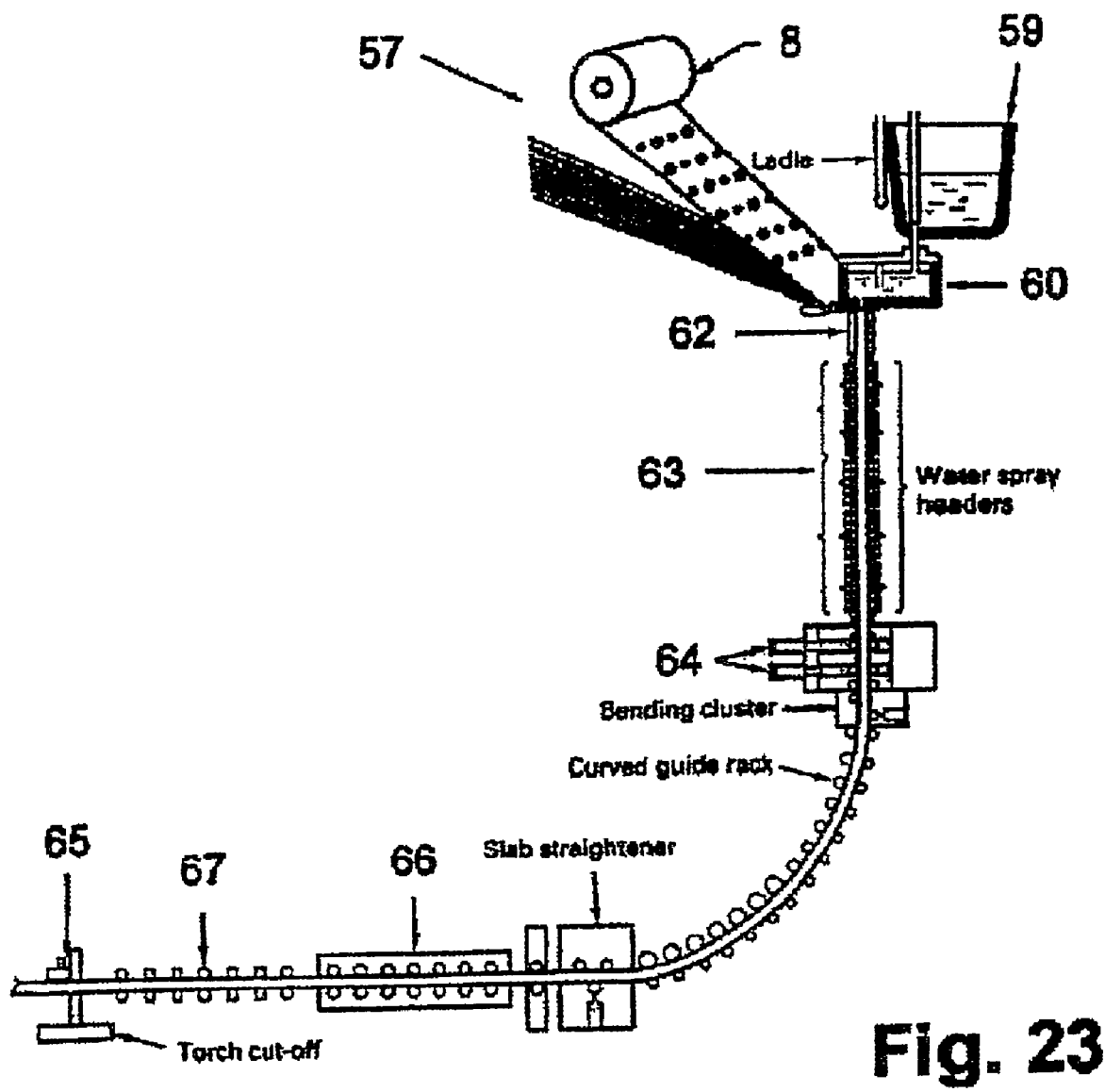
FIG. 23 illustrates a preform according to the present invention used to produce a material using a continuous casting process.
Figure 24:
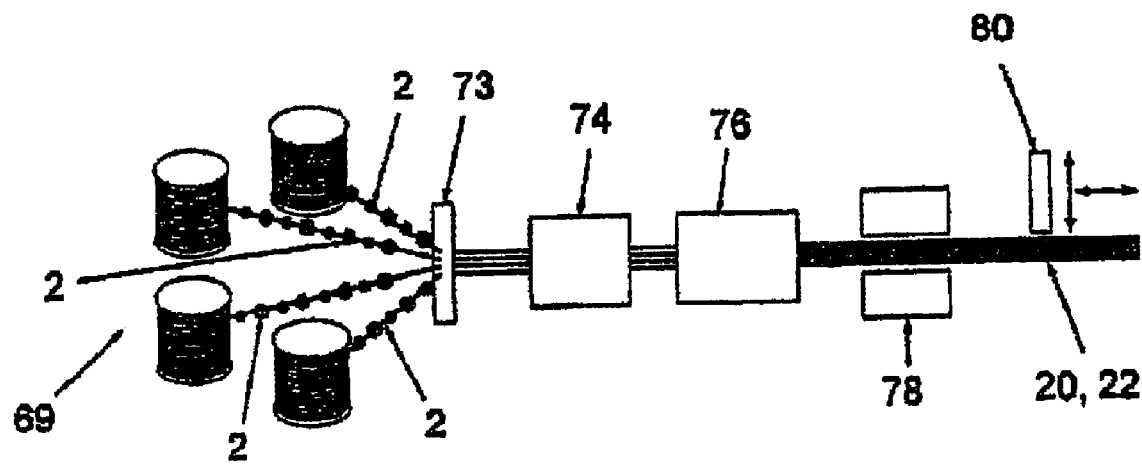
FIGS. 24-25 illustrate a preform according to the present invention used to produce a laminate or fabric using a pultrusion process.
Figure 25:
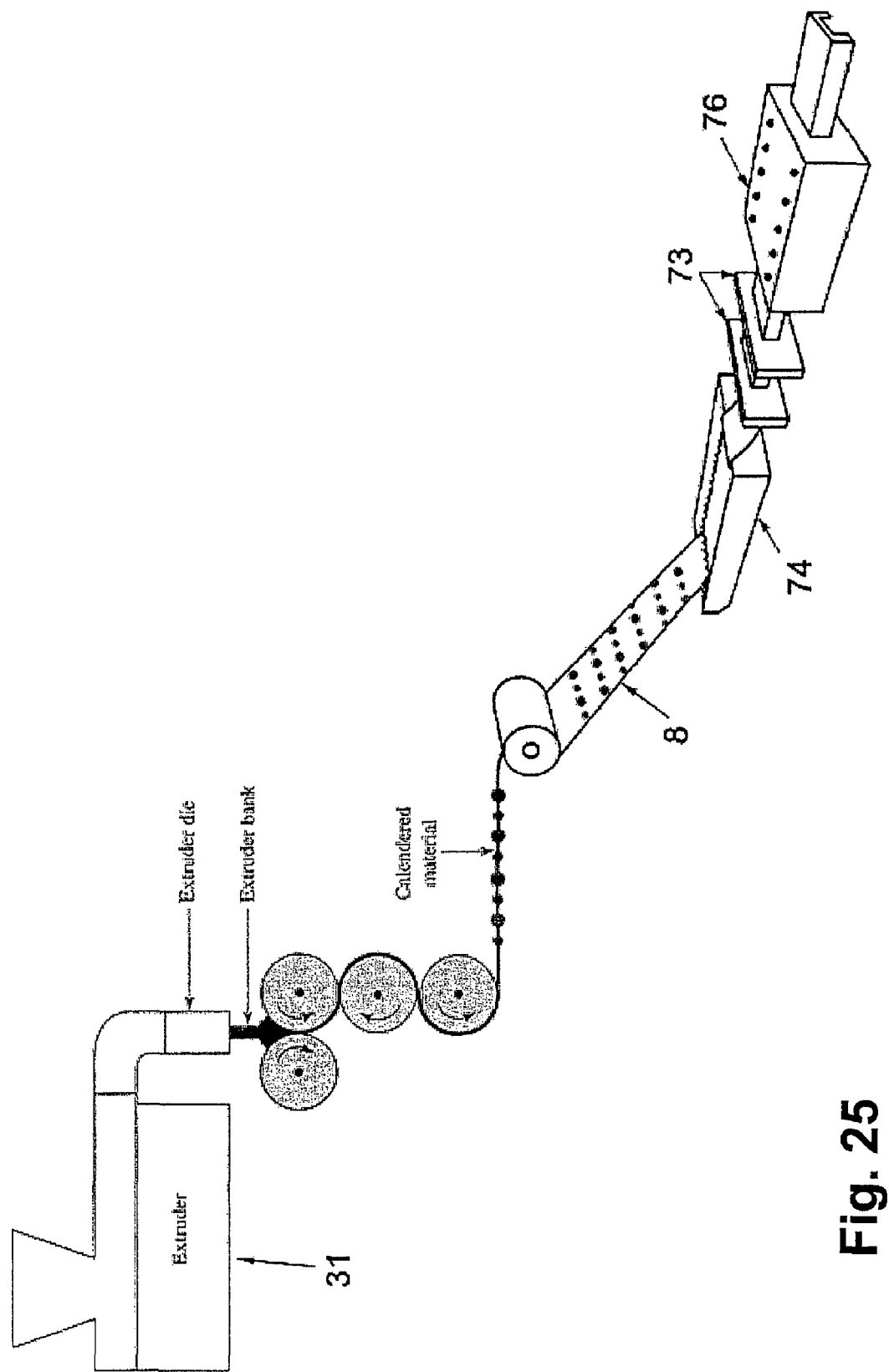

Laminates and fabrics according to the present invention may be manufactured using the filaments and mats in, for example, a pultrusion process as shown in FIG. 24, a continuous casting process as shown in FIG. 23, and a continuous extrusion process as shown in FIG. 25.

Accordingly, all of the aforementioned processes to manufacture the preforms according to the present invention may be continuous or batch processes and may be automated to produce continuous or discontinuous preforms of high quality and uniformity.

An embodiment of the invention relates to a preform for forming a plurality of organized voids in a matrix material, the preform comprising a two-dimensional array of a plurality of beads, wherein at least a subset of the plurality of beads include a first center-to-center distance along a first axis and a second center-to-center distance along a second axis, wherein the beads are provided on a filament in at least one dimension, and wherein the beads have a bead material comprising polyacrylonitrile, carbon fiber, graphite, or combinations thereof. Preferred embodiments relating to the preform are as described above.

Another embodiment of the invention relates to a preform for forming a plurality of organized areas in a matrix material to form a stress-steering structure, the preform comprising a two-dimensional array of a plurality of beads, wherein (a) the beads include a bead material which is less stiff relative to the matrix material, allowing the stress steering structure to operate in a stress-steering manner; (b) at least a subset of the plurality of beads include a first center-to-center distance along a first axis and a second center-to-center distance along a second axis, wherein the beads are provided on a filament in at least one dimension; and (c) the bead material is polyacrylonitrile, carbon fiber, graphite, or a combination thereof. Preferred embodiments relating to the preform are as described above.

Another embodiment of the invention relates to a stress-steering material comprising a preform for forming a plurality of organized voids in a matrix material, the preform comprising a two-dimensional array of a plurality of beads, wherein at least a subset of the plurality of beads include a first center-to-center distance along a first axis and a second center-to-center distance along a second axis, wherein the beads are provided on a filament in at least one dimension, and wherein the beads have a bead material comprising polyacrylonitrile, carbon fiber, graphite, or combinations thereof.

The bead material or beaded filament may include carbon-based materials, including polyacrylonitrile, carbon fiber, and graphite. Carbon-based materials may be used to form the bead materials and beaded filaments of the preforms, which may be used to establish the organized voids in nearly any matrix material in nearly any manufacturing technology. To maximize the stress-steering properties of the resulting engineered material, cohesion between the bead/filament material and the matrix material is preferably minimized and most preferably eliminated. While cohesion is minimized or eliminated, the bead/filament material may still contact the matrix material.

Polyacrylonitrile (PAN) may be used as the starting material in making beaded materials or beaded filaments used in the manufacture of preforms. PAN, which is made from the acrylonitrile monomer, is used principally for making fibers. When made into a fiber, PAN is called acrylic and is characterized by its softness and ease of coloring. The fiber may be used in a variety of products, such as sweaters and carpets.

PAN is also a precursor material to carbon fiber and graphite materials. Carbon fiber is produced from PAN by first oxidizing the PAN material. As known by those of skill in the art, this may be performed by heating the PAN for a sufficient period of time to a temperature ranging from about 250° C. to about 300° C. in an atmosphere of air. This process evolves hydrogen from the material and adds less volatile oxygen. Oxidation converts PAN from a thermoplastic to a thermoset.

Typically, oxidized PAN has a carbon level in the range of 60-65%. The PAN polymer changes from a ladder structure to a stable ring structure, and the fiber changes color from white to brown to black. Upon oxidation, the PAN becomes inflammable (fireproof) and thermally stabilized (or oxygen stabilized). When such a beaded material or beaded filament is used in a preform, the preform exhibits at least some of the properties of the beaded material or beaded filament. Thus, the preform becomes unsusceptible to burning, melting, softening, and/or dripping.

Subjecting the oxidized PAN to temperatures above 300° C. induces progressive partial carbonization of the oxidized PAN, up to a temperature of about 3000° C., when the oxidized PAN is fully evolved to nearly 100% carbon. Therefore, to induce the carbonization process, the oxidized PAN may be heated for a second period of time to a temperature ranging from 300° C. to about 3000° C., preferably from about 1000° C. to about 2500° C. Raising the temperature above 2500° C. creates the possibility of graphite formation. The temperature used to treat the oxidized PAN will depend on whether the PAN contains additional chemical components as well as on the properties desired in the resulting material. The carbonization process should take place in an inert atmosphere, for example, a carbon gas atmosphere. The second heating process creates carbon chains generally characterized as long and wide. The carbon chain material is considered a carbon fiber material, and exhibits properties attributable to carbon-based materials that have been exposed to carbonization temperatures. After carbonization, the resulting carbon fiber may be subjected to surface treatments, sizing treatments, or other treatments known to those of skill in the art to obtain additional or custom properties of the carbon fiber.

Graphite may be produced by heating the carbon fibers to a temperature at least about 200° C. above the carbonization temperature. Graphitization should occur no later than when the temperature exceeds 2500° C. Graphite is softer than carbon fiber and relatively weak because of the crystalline order of the material and closer spacing between the monoplanes and stacks of molecules. As is known to those in the art, the graphite structure can be compared to a deck of cards with individual layers able to easily slide off the deck. This phenomenon gives the material a self-lubricating ability, which often times represents a preferred property.

The melting point of the matrix material makes certain bead material or beaded filament preferential for use with certain matrix materials. The preferences lie in the ease of forming a preform containing both the bead material or beaded filament and the matrix material. For instance, if the matrix material has a melt temperature below about 300° C., which is the case for most plastics, oxidized PAN or carbon fiber is preferably used as the bead material or beaded filament in the preform. If the matrix material has a melt temperature above 300° C., carbonized PAN or graphite is preferably used as the bead material or beaded filament material in the preform. Some plastics, as well as most metals, metal alloys, and ceramics have melting points above 300° C. However, it should still be noted that preforms made of oxidized PAN, carbon fiber, or graphite may be used with all matrix materials, regardless of the melting point of the matrix material.

The degree of carbonization can be tuned to the melt temperatures of respective matrix materials and preforms and the manufacturing environment in which the products and structures are produced. During the manufacturing of the beaded filaments, the bead material and beaded filaments tend to shrink—at times up to about 50% by weight—as a function of temperature during pyrolysis, i.e., the progressive oxidationcarbonization-graphitization process. Under certain circumstances, this can reduce the size of the voids created by the beads and beaded filaments. Therefore, restraint on longitudinal shrinkage can help maintain bead spacing and develop additional molecular orientation.

Longitudinal shrinkage may be restrained by putting the beaded filaments in tension, as is done, for example, by utilizing a stretching procedure during stabilization. Alternatively, shrinkage may be accommodated by design, i.e., the physical and chemical parameters of the beaded filaments prior to pyrolysis. Preferably, a combination of both design and induced tension are used to restrain longitudinal shrinkage.

It is feasible that in some processes for manufacturing a structure, for example, it would be desirable to induce additional carbonization of the beaded preform, e.g., as a function of the processing temperature of the matrix material or additional thermal processing of the structure. For example, variations of the continuous casting process involve tension on the beaded filaments, e.g., as the casting is drawn (pulled) through a die. If additional carbonization is induced during this process, the tension on the beaded filaments may be tuned to restrain, to some degree, the anticipated potential longitudinal shrinkage.

Beaded materials or beaded filaments made with PAN, carbon fibers, or graphite are generally lightweight, having specific densities ranging from about 1.4 g/cc to about 1.8 g/cc. The beaded materials and filaments also exhibit high strength and high modulus properties; good chemically stability; strong resistance to acids, bases, and solvents; small coefficients of linear expansion; good dimensional stability; and strong conductivity. Additionally, the inertness of the beaded materials or filaments makes them suitable for various medical applications, e.g., hip and knee replacements, as well as other medical uses known to those of skill in the art.

While the above methods of producing oxidized and carbonized PAN are the preferred methods, it should be noted that oxidized and carbonized beaded material or filaments can be made from almost anything that yields a quality char upon pyrolysis, i.e., decomposition by heating. The starting material should contain enough carbon so that the resultant bead material or filament is both physically and economically attractive. Viable starting materials, besides PAN, include pitch, rayon, phenol, lignin, imides, amides, vinyl polymers, and various naturally occurring cellulosic materials.

Regardless of the starting material, the following basic sequence in forming preform products from the starting material is followed: spinning, stabilization, oxidation/carbonization, and application to a sizing. See FIG. 34. Spinning involves forming the precursor material (e.g., PAN precursor) into a filament using variants of standard textile fiber manufacturing processes. Stabilization includes stretching the starting precursor (e.g., via a continuous tow) and shaping it during solidification by adding beads in a predetermined format via calendaring or other means to create the beads. The stabilization step may include a stretching step that helps develop the highly oriented molecular structure that makes the precursor stronger and more robust for subsequent treatment and use in the preform products and structures. Particular configurations, e.g., specific bead sizes and spacing, may also be formulated. See FIG. 35. Oxidation and carbonization have been discussed above. Application of a sizing (or a variety of sizings, or coatings, depending on the application) to the beaded material or beaded filament is the final step before spooling. The primary purpose of the application step is to (a) preclude bonding of the bead or filaments with the respective matrix materials, (b) preclude absorption of the respective matrix materials by the beads during the product manufacture, and (c) minimize damage during handling.

Filaments, mats, tows, laminates, and fabrics according to the present invention may be used to create materials, including stress steering materials, in a variety of additional manufacturing processes. For convenience, Applicant has provided the following list of manufacturing processes in which preforms according to the present invention may be used. These include:

Additive Manufacturing:
atomistic manufacturing;
layered manufacturing including fused deposition modeling, stereo-lithography, optical fabrication, solid base (Ground) curing, plasma spray forming, sputtering, vapor deposition;

Deformation and Forming:
bulk deformation processes including impression-die forging, open-die forging, coining, piercing, hubbing, fullering and edging, roll forging, ring rolling, direct extrusion, indirect extrusion, hydrostatic extrusion and impact extrusion;
sheet metal forming processes including shearing, bulging, rubber forming, high-energy-rate forming, superplastic forming, deep drawing, embossing;
material removal including cutting, grinding, electrical discharge machining, water-jet machining, abrasive-jet machining, chemical machining and electrochemical machining and grinding;

Casting:
permanent molds including slush casting, pressure casting, insert molding, centrifugal casting and infiltration casting;
expendable molds including vacuum casting, ceramic-mold casting, plaster-mold casting, shell-mold casting and sand casting;
gel-casting, injection molding, compression molding, transfer molding, insert molding;

Particulate material processing;
sintering, cold isostatic pressing, and hot isostatic pressing; and Assembly and joining processes;
friction stir welding, Resistance welding, explosive welding, brazing and soldering, arc welding, and laser welding.

The following example addresses the use of preforms as used with continuous manufacturing processes.

Continuous Manufacturing Processes Utilizing Preforms-Continuous Casting

The preforms according to the present invention are ideally suited for producing engineered materials using a continuous material manufacturing process, i.e., continuous (preform) casting and continuous extrusion manufacturing processes. Continuous preform casting utilizes two long established manufacturing processes used for casting a continuous tape of material—pultrusion and continuous casting.

Conventionally, these manufacturing processes produce materials having a constant cross-section with shapes including round, rectangular, tabular, plate, sheet, and structural products. In the present invention, the processes are modified to include preform fixtures for channeling filaments and/or mats into proper alignment with a matrix material (and optional continuous, reinforcement such as fibers). The fixtures may also be used to contour the preform/matrix combination.

The production flow in continuous preform casting may be uninterrupted from the introduction of the preforms into a molten material to the output of engineered products. Whatever the primary material (metal, plastic, or ceramic), the initial feedstock is a fluid (or a melt): molten metals, monomer solutions, slips, and slurries. Post casting processes vary depending on the choice of the matrix material, with ceramics being sintered and metals being generally rolled.

The use of graphite as the bead material in preforms is well suited to establish stress-steering architectures in continuous casting processes for high-temperature matrix materials, such as aluminum, steel, cast iron, and titanium, as well as other metals and metal alloys. The matrix material may also be a plastic, a ceramic, or other metal and non-metal materials known to those of skill in the art. Relative to the matrix material, graphite is a softer material that results in a final product operating in a better stress-steering manner. PAN and carbon fiber material may also be used as the bead material for preforms to produce steer-steering materials with improved properties.

The following is an example of a continuous casting process. In the continuous casting process, for example, as illustrated in FIG. 23, a continuous mat 8 (and/or filament) is fed into a tundish 60 of a casting apparatus 57 where molten material 59 and the mat flow out of the tundish through a water-cooled, continuous mold 62. The mold generally determines the thickness and/or profile of the resulting material, but not the length, and may be positioned vertically, horizontally or at another angle, depending on the desired material flow.

There, the mat/material composition flows down a discharge rack 63 and is cooled. The cast can be further processed into final form, through various inline applications of heat and mechanical force (e.g., pinch rolling 64, reheating 66) to give it the desired shape, size, physical properties, and surface qualities. Such inline applications include pinch rolling, reheating/cooling, and the like. After such processing, a sizing area 67 sizes the slab of material to a particular size, whereby a cut-off torch 65 (or other cutting device appropriate for the particular cast material) is used to cut the slab into a plurality of pieces.

Due to the potential rigors of both the casting (e.g., temperature) and post-casting processing (e.g., rolling), the size, shape, alignment, and composition of the beaded preforms according to the present invention for inclusion in such a casting process may be structured and organized in anticipation of alterations resulting from the process to achieve the desired array of voids in the final product. To that end, it is preferable that characteristics of the preforms substantially match with the mechanics of the continuous processing process to produce the desired product.

While the preforms can be organized for extreme (or bulk) deformation processes, these are equally well suited for near net shape casting, or thin-slab casting, for example.

Although metals are known materials which are used in a continuous casting process, continuous casting of plastics and ceramics can be achieved through a variation of the basic tape casting process. For example, a liquid resin material (usually acrylic syrup) is poured between two horizontal and continuous belts separated by a gasket. The gasket retains the liquid resin and defines the thickness of the tape. A similar process may be used to produce metal and ceramic tapes, as well as combination tapes that are a mix or alloy of all three types of basic materials, i.e., metals, plastics, and ceramics. Laminates and fabrics according to the present invention may be easily manufactured using this process by using a preform fixture to supplement, or in place of, the gasket.

Preforms according to the present invention may also be fabricated as expendable patterns in mold casting. A pattern, or copy, in one piece or in sections, of a product to be made by casting is used to establish the shape and dimensions of the mold cavity. While the matrix materials of patterns are expendable, these patterns contain the beaded preforms according to the present invention (that may be either sacrificial or permanent). Among the casting processes that may use expendable preform patterns are lost foam and investment casting as explained below.

In conventional lost foam casting, the pattern is made of expendable polystyrene (EPS) beads. As the molten metal is poured into the mold, it replaces the EPS pattern, which vaporizes. The Preforms, with polystyrene (PS) matrices with incorporated beaded filaments and/or mats, may be used in this process to form engineered products. These patterns may begin as PS preform slabs.

PS preform slabs may be made by continuous preform casting or continuous extrusion processes using a PS solution as feedstock. The slabs may be formed by introducing a foaming agent into a PS solution, or melt, that then is properly integrated with beaded filaments and/or mats to form a continuous tape. The tape may pass between belts or plates with a specific gap between them while the foaming agent expands the tape to fill the gap, fixing the dimensions of the tape. This PS continuous tape may be cooled and cut into the slabs. The slabs may be partially or fully expanded, depending on the choice of subsequent casting procedures.

The beaded filaments and/or mats are aligned in the PS solution or melt to reconcile the degree of expansion with the geometry of the void array desired in the final product.

For high-production runs, slabs may be converted into EPS preform patterns in heated molds or dies that burn away excess material from the slabs to conform each one to the shape of the desired pattern. For example, a slab can be expanded within a heated mold to conform to the shape of the mold cavity, or an oversized slab can be forged in a heated die to the desired shape. For shorter runs, pattern shapes may be cut out of the slabs using conventional woodworking equipment and, if necessary, these shapes may be assembled with glue to form the final pattern.

Squeeze Casting is a combination of casting and forging. In this process, forging means squeezing, or pressing, an unconsolidated feedstock into a predetermined shape. In squeeze casting, casting preform feedstock according to the present invention is placed in the bottom section of a preheated die. A heated upper die then descends, applying pressure throughout the duration of consolidation of the feedstock. Using this process, intricate shapes can be produced at pressures that are far less than would normally be required for hot or cold forging. Accordingly, tows and laminates can be consolidated by the heat and pressure and shaped by the die to form the final product, while the void space created by the beaded preforms can be preserved (although these preforms may be sacrificed in the process).

This thermo-mechanical processing of the casting feedstock during squeezing produces a forged microstructure that has enhanced ductility over the original cast microstructure. In a similar embodiment of this process, a liquid (or thixotropic material) is forced around a preform pattern(s) in a mold. Thixotropic materials eliminate the need to introduce a precise amount of molten metal into the die since chunks of solid matrix material are used and these have been heated into a semi-solid (liquid plus solid) state.

Because of the properties of the thixotropic material, it can be handled mechanically, like a solid, but shaped at low pressures because it flows like a liquid when agitated or squeezed. An additional advantage of the material is that the absence of a turbulent flow minimizes gas pickup and entrapment. Moreover, since the material is already partially solid, solidification shrinkage and related undesirable porosity is reduced. For example, semi-solid metal flows in a viscous manner, allowing thin-cast sections to be filled rapidly without jetting and spraying of liquid metal that would normally occur.

Pultrusion

Although the continuous preform casting process may be used to form intermediate and final products composed of plastics, metals, and ceramics, plastic resins are typically the matrix material used in pultrusion. Pultrusion is a cost-effective automated process for continuous production of composite materials of constant cross-sectional area such as round, rectangular, tabular, plate, sheet, and structural products. Recent innovations, however, have also allowed pultrusion fabrication of composites with varying cross-sectional areas.

Pultrusion may be used to manufacture both laminates and fabrics containing the preforms according to the present invention (FIG. 24). Accordingly, fixtures 73 are provided in a pultrusion system to properly align the preforms with the matrix material consistent with the profile and architecture of the desired product.

In the present invention, pultrusion, as shown in FIGS. 24-25 generally includes a fiber delivery system 69, a resin bath 74, preform fixtures/heated die 76, synchronized pullers 78, and a cut-off device 80 (e.g., torch, saw, and the like). One or more bundles of continuous filaments 2 (or mats, and/or weaves) are guided through delivery fixtures 73 that align the preforms with a matrix material and contour the combination of components into a desired shape. The composition may then be pulled through one or more heated dies 76 (fixed or floating) for further shaping, compacting, and solidifying of the matrix material and for eliminating sacrificial filaments, mats, and/or weaves. Thereafter, the fabricated material is cooled and cut to length for further fabrication into intermediate and finished products.

Continuous Extrusion

Continuous Extrusion may be used in coordination with pultrusion (extruding apparatus 31 as shown in FIG. 25) to yield a continuous process whereby preforms are created through extrusion, and organized into final products using pultrusion. Extrusion (as previously described) is a process that forces a continuous stream of material into a shaping tool (a die), or into some other subsequent shaping process, to form a filament, mat, and laminate according to the present invention.

Accordingly, laminates may be formed through either post extrusion coating of beaded filaments and mats with a matrix material, or post extrusion addition of texture to a tape. In the latter case, the tape may be either texturized with patterns that are applied by (for example) calendaring, or excised through (for example) selective laser burnout.

Batch Processing

Batch processing technologies also may be used to fabricate preforms according to the present invention, as well as engineered intermediate goods and consumer products including those having a stress steering structure. Such batch processes include additive manufacturing (AM) and particulate manufacturing technology. The former is solely a batch process, while the latter may also be a continuous process.

AM provides the capability to incorporate actual voids, versus void precursors, into fabrics in a one-step process. Additive Manufacturing is a family of processes that involve creating 3D objects by automatically placing 2D layers of material on top of each other under computer control. The advantage is that a structure's geometric complexity has little impact on the fabrication process. Within this family are processes currently known as Rapid Prototyping and Solid Freeform Fabrication, or Layered Manufacturing, among others. These include purely additive processes, such as Selective Laser Sintering and Laser Metal Deposition, and hybrid methods like Shape Deposition Manufacturing, which involves both material deposition and removal operations.

AM processes reproduce preforms layer-by-layer in an uninterrupted sequence. For example, a fabric according to the present invention may be produced as a series of alternating layers of solid mass and layers containing either beads (sacrificial or permanent) or actual voids.

An attractive and powerful feature of AM as used in conjunction with the present invention is the capability to endow products with varying macro- and microstructures. Accordingly, this technology may be employed to incorporate actual voids and preform materials in fabrics, and to make heterogeneous and hierarchical compositions.

AM technology utilizing 3D printing may also be used which brings the potential for production of intermediate and finished fabrics according to the present invention to create functional parts and products made out of plastic, metal, and ceramic powders.

Particulate manufacturing technology (Powder Metallurgy) is a process by which fine powdered materials (metals, plastics, and ceramics, among others) are blended, pressed into a desired shape (compacted), and then heated (sintered) in a controlled atmosphere to bond the contacting surfaces of the particles and establish the desired properties. Properly sized, shaped, and positioned, filaments and mats according to the present invention may be incorporated in this process by surrounding the preforms with powdered material and compacting this composition into a "green" fabric for later sintering into a final engineered product. One advantage of this process is the ability of the assembled material to keep its shape before and during sintering. During sintering, the "green" fabric may be heated just below the melting point of the matrix material, right below its liquid melt point. Consequently, the compact would not loose its shape. Thus, the void space would be preserved because the compacted particles would melt only slightly and bond to form the final product. During sintering, of course, any sacrificial preforms may be eliminated.

For high tolerance products, the sintered product may be re-pressed, which in general may make the product more accurate with a better surface finish. The voids also may be impregnated, for example, in an oil bath. This process is very similar to continuous casting as described above, except that the matrix material is a powder, not a melt.

Particulate technology may be used to form fabrics to be used as expendable patterns for lost foam and investment casting, as well as preforms for squeeze casting. Particle technology, of course, is the basis of various ceramic and polymer resin processing techniques, including tape casting of ceramics and plastics.

The symmetry of a particular stress steering structure and the concomitant orthogonal alignment of the voids afford the manufacture of engineered materials, components, products, and structures using a wide range of manufacturing processes as indicated above. Which of these processes is best for manufacturing a particular product is a function of several basic considerations including product geometry, material characteristics, and economics.

Texturized Materials as Precursors to Voided Stress-Steering Structures

Figure 26:
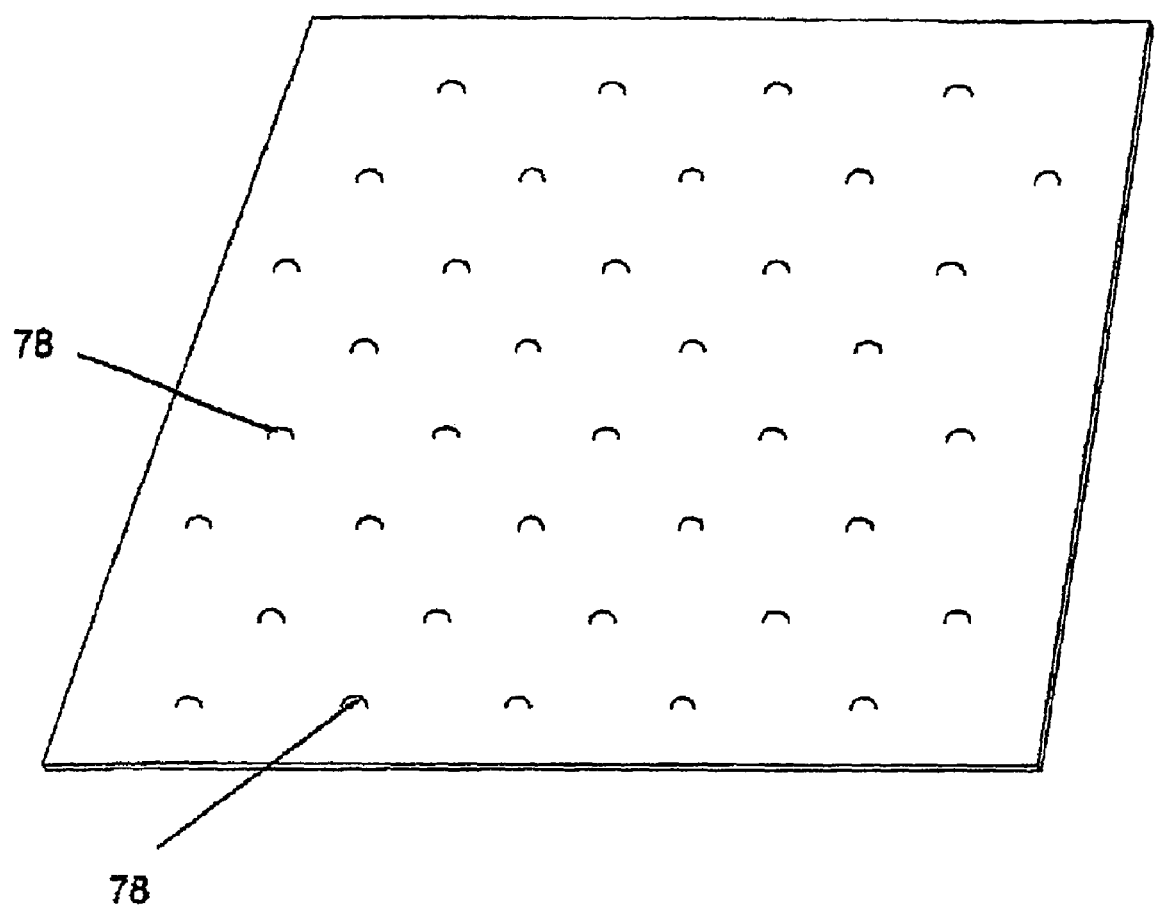
FIG. 26 illustrates a texturized material according to a second embodiment of the present invention with a first organization of dimples.
Figure 27:
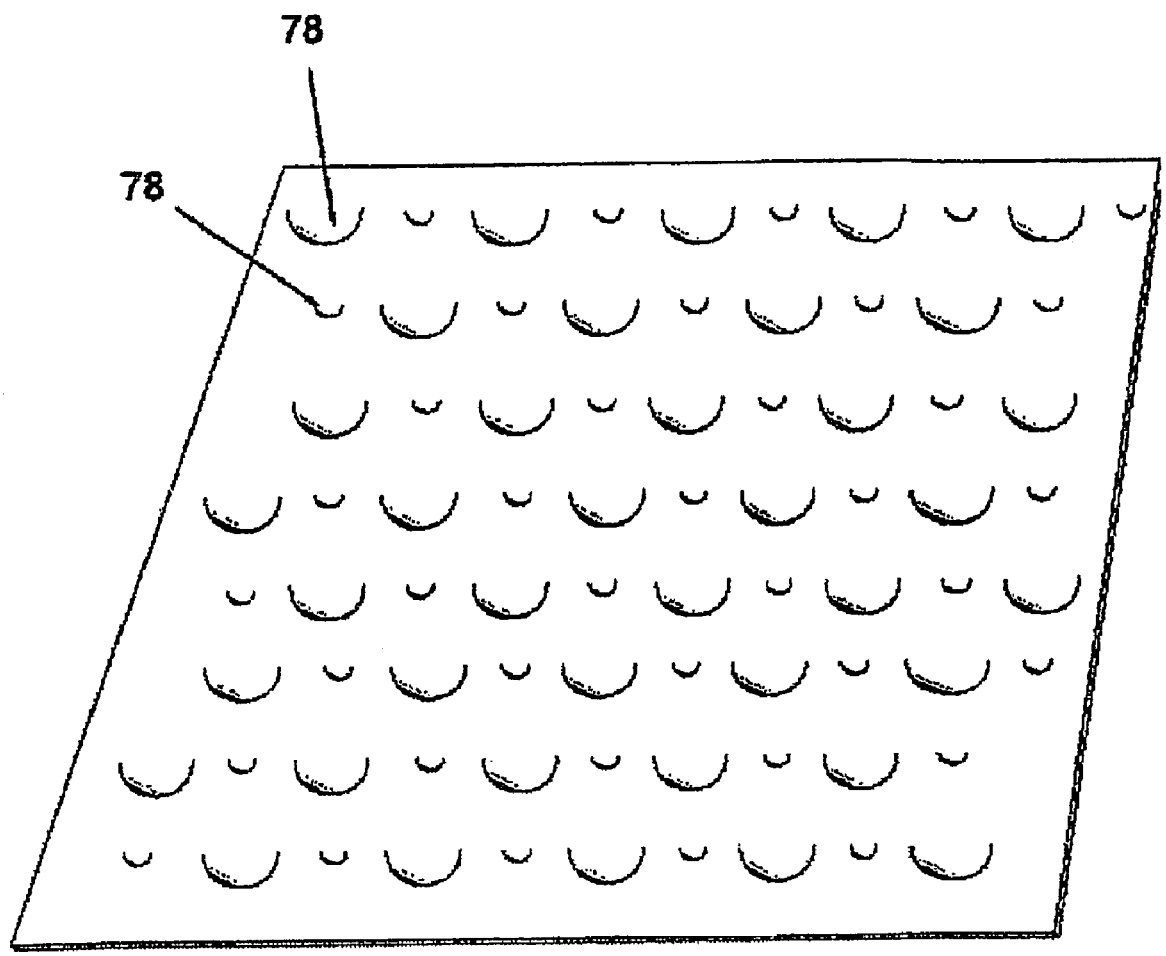
FIG. 27 illustrates a texturized material according to a second embodiment of the present invention with a second organization of dimples.
Figure 28:
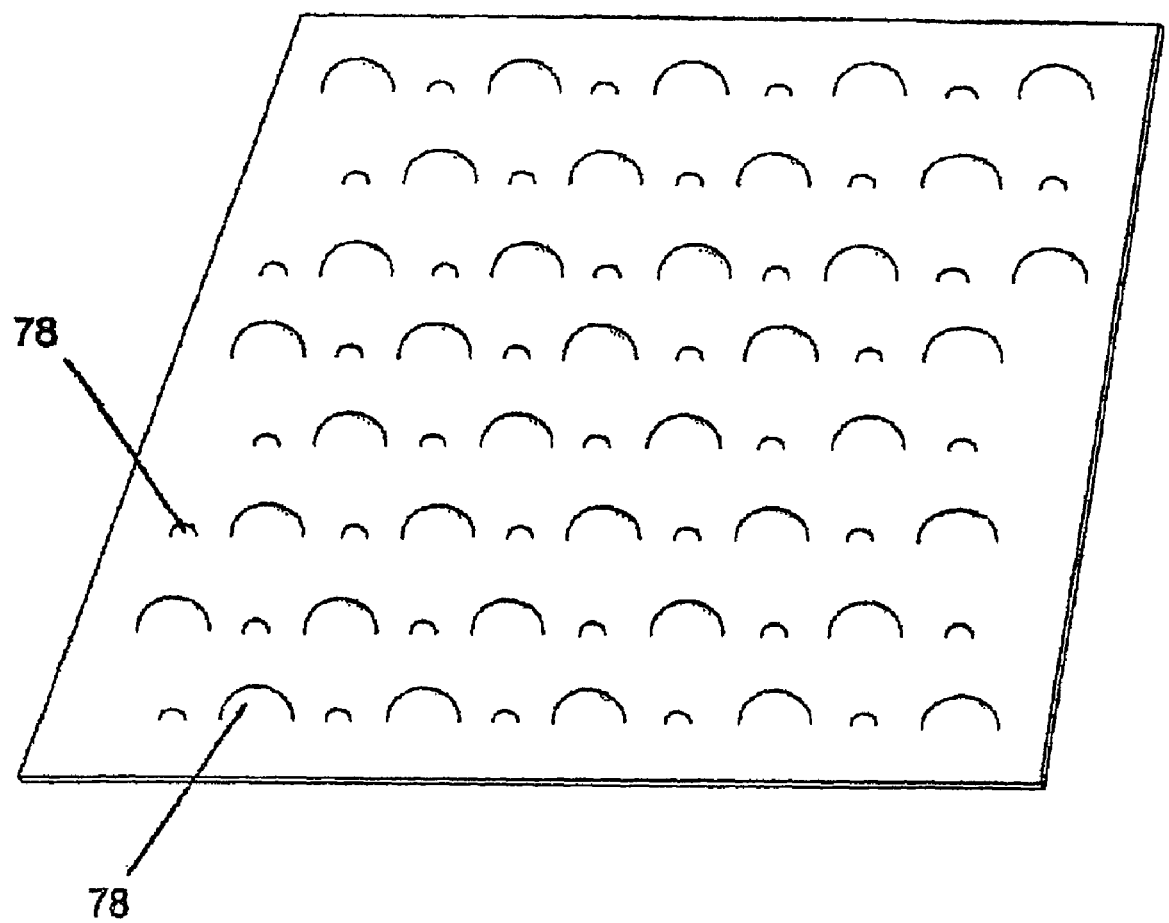
FIG. 28 illustrates a texturized material according to a second embodiment of the present invention with a third organization of dimples.

The voids for engineered structures, including stress steering structures, may also be provided by incorporating a texture onto a laminate. Examples of such textures are illustrated in FIGS. 26-28. As shown, dimples 78 are imparted onto a surface of a material. Such dimples may be involve the entire thickness of the material, in that, dimples are present on one side (i.e., shallow openings), and corresponding protruding areas on the other side of the material.

Generally, to produce preferred symmetrical voids according to the present invention using texturizing, a pattern of texture may be incorporated into one or both surfaces of a laminate, depending on the void array to be realized in the final engineered product. Texturizing may also impart tape cutting and laminate stacking guides so that the laminates may be assembled into a composite and final products more easily (as with tows and laminate detailed above).

Textures may be added to laminates through imprinting and excising (i.e., the removal of material). To minimize material requirements, imprinting is used to impart a required texture according to the present invention on a laminate surface. Imprinting redistributes the material of the laminate, so the material is not wasted (as it is through excising). Accordingly, void precursors in laminate surfaces may be the result of (1) localized material compression which redistributes material out-of-plane (e.g., forged indentures), or (2) redistribution of the material of the laminate in-plane (e.g. by shape rolling).

In a preferred embodiment, a thixotropic laminate material is used during the imprinting of the texture. The laminate is imprinted when the laminar material is heated to a "green" state so that the material easily redistributes itself. In a continuous casting or molding process, this is readily accomplished in situ during the casting of metal, plastic, and ceramics. Thus, metals like aluminum and steel. (e.g., foils) could be imprinted inline at the end of a hot rolling sequence; plastics could be imprinted inline, for example, during plastic film casting; and ceramics could be imprinted inline during tape casting when the tape is in a green, unfired state.

Assuring material redistribution, of course, is not a concern when excising laminates to create the textured patterns through, for example, selective laser burnout or chemical etching.

An advantage of texturizing tape castings to produce patterned laminates is the ability to consolidate tapes using heat, pressure, and dwell time to form a monolithic composite structure comprising many layers (which may be of different base compositions to produce functionally-graded products, for example). This advantage may be enhanced by drawing and texturizing the unconsolidated tapes as a continuation of the tape casting line while the tapes are still heated.

Composites formed of textured laminates are generally preferably formed using mechanical and adhesive joining as well as welding. This is especially true of texturized metals, although metals may be heated and compressed to achieve consolidation. Texturized ceramic laminates, on the other hand, must be sintered.

Texturized plastic laminates may be welded, as well, using microwave, ultrasonic, rf, and induction techniques. Induction welding uses the heat generated by a metal filler in the plastic moving through a magnetic field to heat the plastic material.

While the system of the present invention has been described with reference to the above manufacturing materials, processes, and systems, it should be apparent to those skilled in the art that the present invention may be used/made with other materials, processes, and systems not specifically referenced here.

Having described the invention with reference to the presently preferred embodiments, it should be understood that numerous changes in construction may be introduced without departing from the true spirit of the invention as defined in the appended claims.

What is claims is:

1. A beaded preform for forming an engineered material, wherein said engineered material has an internal surface that takes on the shape of the beaded preform, said preform comprising a two-dimensional array of a plurality of beads along a preform material in at least one dimension, wherein at least a subset of the plurality of beads includes a first center-to-center distance along a first axis and a second center-to-center distance along a second axis, and wherein said preform material is a thermoset material.

2. The preform according to claim 1, wherein said two-dimensional array comprises a plurality of filaments each comprising a group of said plurality of beads arranged along a strand.

3. The preform according to claim 1, wherein each of the beads is provided on a filament.

4. The preform according to claim 1, wherein a plurality of the beads is different in size along the first axis.

5. The preform according to claim 1, wherein a plurality of the beads is different in size along the second axis.

6. The preform according to claim 1, wherein a plurality of the beads is different in size along a third axis.

7. The preform according to claim 1, wherein the thermoset material is carbon, carbon fiber, or oxidized polyacrylonitrile.

8. The preform according to claim 1, wherein the thermoset material is graphite or carbonized polyacrylonitrile.

9. The preform according to claim 1, wherein the thermoset material is selected from the group consisting of synthetic materials, inorganic materials, organic materials, and combinations thereof.

10. The preform according to claim 1, wherein said preform material and the material of said plurality of beads are the same material.

11. The preform according to claim 10, wherein said plurality of beads is coated with a coating material that is different from the material of the beads, and said coating material is selected from the group consisting of synthetic materials, inorganic materials, organic materials, and combinations thereof.

12. The preform according to claim 1, wherein said preform material and the material of said plurality of beads are different materials.

13. The preform according to claim 1, wherein the preform material comprises at least two different materials.

14. The preform according to claim 1, wherein the material of said plurality of beads comprises at least two different materials.

15. The preform according to claim 1, wherein said plurality of beads contains at least two beads of different materials.

16. The preform according to claim 1, wherein the material of at least one bead of said plurality of beads is a different material than the preform material and the material of another bead.

17. The preform according to claim 1, wherein the length scale of said beaded preform is matched to the mechanical crack-length scale of said engineered material.

18. The preform according to claim 1, wherein said preform material, the material of said plurality of beads, and said engineered material are all the same.

19. The preform according to claim 18, wherein said preform material is coated with a coating material that is different than said engineered material, and said coating material is selected from the group consisting of synthetic materials, inorganic materials, organic materials, and combinations thereof.

* * * * *